(12) United States Patent
Choi

(10) Patent No.: US 10,166,614 B2
(45) Date of Patent: Jan. 1, 2019

(54) ORBITAL CUTTING APPARATUS CAPABLE OF FREELY AND SELECTIVELY CONTROLLING PLURALITY OF CUTTING TOOLS WITHIN ROTATING BODY BY USING ROTATIONAL SPEED RATIO

(71) Applicant: DCSENG CO., LTD., Chungcheongbuk-do (KR)

(72) Inventor: Insung Choi, Daejeon (KR)

(73) Assignee: DCSENG CO., LTD., Chungcheongbuk-Do (KR)

( * ) Notice: Subject to any disclaimer, the term of this patent is extended or adjusted under 35 U.S.C. 154(b) by 91 days.

(21) Appl. No.: 15/304,249

(22) PCT Filed: Oct. 12, 2015

(86) PCT No.: PCT/KR2015/010725
§ 371 (c)(1),
(2) Date: Oct. 14, 2016

(87) PCT Pub. No.: WO2016/060420
PCT Pub. Date: Apr. 21, 2016

(65) Prior Publication Data
US 2017/0259357 A1    Sep. 14, 2017

(30) Foreign Application Priority Data

Oct. 13, 2014  (KR) .................. 10-2014-0137445

(51) Int. Cl.
*B23B 5/08* (2006.01)
*B23B 5/14* (2006.01)
(Continued)

(52) U.S. Cl.
CPC ............... *B23D 21/04* (2013.01); *B23B 3/26* (2013.01); *B23B 3/265* (2013.01); *B23B 5/08* (2013.01);
(Continued)

(58) Field of Classification Search
CPC .... B23B 5/08; B23B 5/14; B23B 3/22; B23B 3/26; B23D 21/04; B23C 2220/68;
(Continued)

(56) References Cited

U.S. PATENT DOCUMENTS 2,484,601 A * 10/1949 Abbey ..................... B23B 5/14
                                                          30/97
2,905,243 A *  9/1959 Rodder ................. B23D 21/04
                                                          82/61
(Continued)

FOREIGN PATENT DOCUMENTS

DE  3113072 A1 * 10/1982 ............. B23D 21/04
DE  4244042 C1 *  6/1994 ............... B23B 5/14
(Continued)

OTHER PUBLICATIONS

International Search Report issued in PCT/KR2015/010725 dated Jan. 27, 2016 (5 pages).

*Primary Examiner* — Ryan Rufo
(74) *Attorney, Agent, or Firm* — RatnerPrestia

(57) ABSTRACT

Disclosed is an orbital cutting apparatus that is capable of freely and selectively controlling forward and backward movement of a plurality of cutting tools, allowing the cutting tools to move forward and backward and to move in an axial direction of a material to be cut so as to enable processing of various shapes as well as cutting and chamfering, and is capable of simultaneously carrying out cutting and chamfering operations for a pipe material or a heavy pipe having a thickness of dozens of mm or more.

9 Claims, 16 Drawing Sheets

(51) Int. Cl.
*B23B 3/26* (2006.01)
*B23D 21/04* (2006.01)
*B23D 21/00* (2006.01)
*B26D 3/16* (2006.01)

(52) U.S. Cl.
CPC ............... *B23B 5/14* (2013.01); *B23D 21/00* (2013.01); *B26D 3/16* (2013.01)

(58) Field of Classification Search
CPC ............ B23G 2240/60; Y10T 82/2527; Y10T 82/2529; Y10T 82/22; Y10T 82/16229; Y10T 82/16361; Y10T 82/16442; Y10T 82/16951
See application file for complete search history.

(56) References Cited

U.S. PATENT DOCUMENTS

| | | | | |
|---|---|---|---|---|
| 4,430,913 | A | * | 2/1984 | Williamson ............ B23B 5/163 82/59 |
| 4,624,052 | A | * | 11/1986 | Garcia ................... B23D 21/04 30/97 |
| 4,655,109 | A | * | 4/1987 | Rungger ................ B23D 21/04 82/47 |
| 5,605,083 | A | | 2/1997 | Lupke et al. |
| 2003/0061919 | A1 | * | 4/2003 | Antoni ............. B23B 29/03478 82/56 |
| 2011/0150591 | A1 | * | 6/2011 | Jansen ..................... B23C 5/26 409/65 |
| 2014/0260840 | A1 | * | 9/2014 | Mori ......................... B23B 3/26 82/113 |

FOREIGN PATENT DOCUMENTS

| | | | | | |
|---|---|---|---|---|---|
| DE | 102011009794 | A1 | * | 8/2012 | ............... B23B 3/26 |
| EP | 0103649 | A1 | * | 3/1984 | ............ B23D 21/04 |
| EP | 2 085 169 | A1 | | 8/2009 | |
| GB | 803657 | A | * | 10/1958 | ............... B23B 5/14 |
| JP | 55-018317 | A | * | 2/1980 | ............... B23B 3/26 |
| JP | 10-086001 | A | * | 4/1998 | ............... B23B 3/26 |
| JP | 2003-117720 | A | | 4/2003 | |
| JP | 2001-096421 | A | | 4/2011 | |
| KR | 10-2011-0033076 | A | | 3/2011 | |
| KR | 10-1216810 | B1 | | 12/2012 | |
| KR | 10-2014-0066480 | | | 5/2014 | |
| KR | 10-1407327 | B1 | | 6/2014 | |
| KR | 10-1407328 | B1 | | 6/2014 | |
| KR | 10-1415513 | B1 | | 7/2014 | |

* cited by examiner

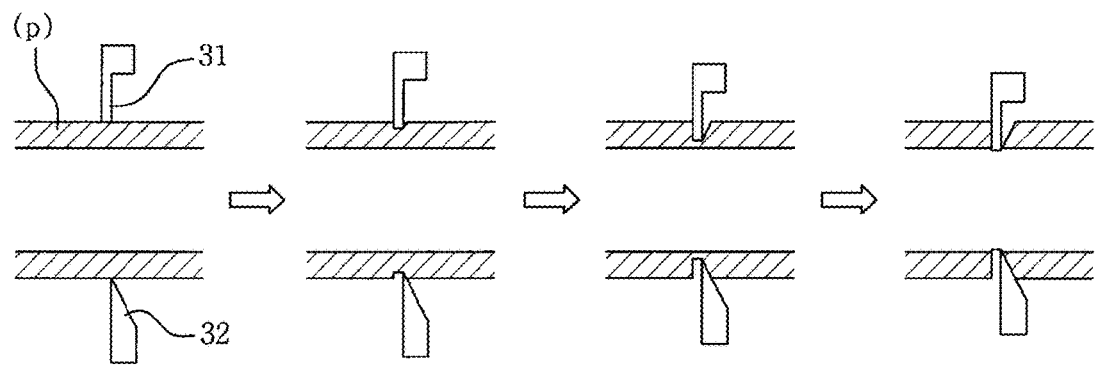
FIG. 3
PRIOR ART
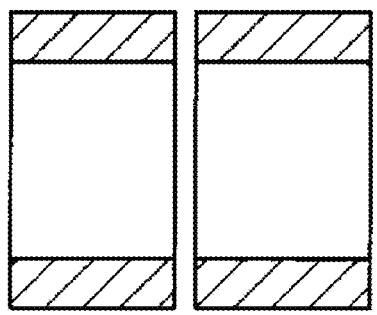
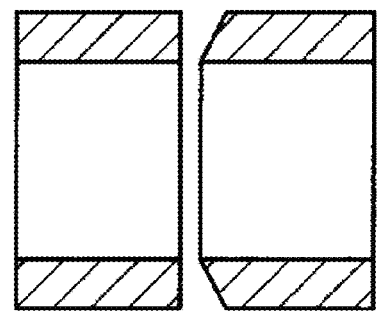
FIG. 4A
PRIOR ART
FIG. 4B
PRIOR ART

[First Pushing]

[Second Pushing]

ORBITAL CUTTING APPARATUS CAPABLE OF FREELY AND SELECTIVELY CONTROLLING PLURALITY OF CUTTING TOOLS WITHIN ROTATING BODY BY USING ROTATIONAL SPEED RATIO

CROSS REFERENCE TO RELATED APPLICATIONS

This application is the U.S. National Phase Application of PCT/KR2015/010725, filed Oct. 12, 2015, which claims priority to Korean Patent Application No. 10-2014-0137445, filed Oct. 31, 2014, the contents of such applications being incorporated by reference herein.

TECHNICAL FIELD

The present disclosure relates to an orbital cutting apparatus, and more particularly, to an orbital cutting apparatus that is capable of freely and selectively controlling the movements of a plurality of cutting tools that enter a material, depending on a rotational speed ratio of synchronized wheels.

BACKGROUND ART

In connection with a cutting technique of a pipe, as the size and weight of pipes gradually increase, orbital cutting apparatuses are being developed, in which a cutting tool performs cutting while rotating around and peeling the outer circumference of a fixed pipe little by little by a predetermined depth. Such an orbital cutting apparatus for a pipe is now capable of performing chamfering and cutting by being equipped with both of a cutting tool and a chamfering tool.

As an example of an orbital cutting/chamfering apparatus as described above, an apparatus illustrated in FIGS. 1 and 2 (hereinafter, referred to as "Prior Art 1") has been disclosed. As illustrated in FIGS. 1 and 2, Prior Art 1 includes a main body 10 configured to fix a pipe material P positioned at the center thereof. When the pipe material P passes through any one side (front side) of the main body 10, a rotary body 20 configured to be rotated by an electric motor 15 is coupled to the pipe material P. A cutting tool 31 and a chamfering tool 32 are mounted at the front side of the rotary body 20 to be opposite to each other (or two or more tools to be balanced) such that the cutting tool 31 and the chamfering tool 32 are configured to move vertically (toward the center of the pipe material) by a predetermined depth whenever the rotary body 20 rotates once. Here, the cutting tool 31 and the chamfering tool 32 are mounted on a block 40, which is guided to be capable of reciprocating toward the center of the pipe material P on the front face of the rotary body 20, and the blocks 40 are screw-coupled to a rotary shaft 50, of which the upper end is formed with a gear 51. Accordingly, whenever the gear 51 comes in contact with a finger stop 60 protruding from the main body 10, the rotary shaft 50 vertically moves the block 40 by a pitch corresponding to the rotating angle of the gear 51 so as to make the cutting tool 31 and the chamfering tool 32 move forward to the center of the pipe material P.

As described above, Prior Art 1 is related to an apparatus that is capable of cutting the pipe material or simultaneously cutting and chamfering the pipe material by causing the cutting tool 31 and the chamfering tool 32 to dig into the pipe material P by a predetermined depth whenever the cutting tool 31 and the chamfering tool 32 revolve around the pipe material one round, but is a limited technique that cannot arbitrarily control the movements of the cutting tool and the chamfering tool. That is, Prior Art 1 cannot arbitrarily adjust the cutting tool and the chamfering tool while the rotary body 20 is being moved.

When the cutting tool and the chamfering tool cannot be adjusted, it means that cutting conditions cannot be changed depending on the size, material, kind, or the like of a workpiece. This may naturally deteriorate the cutting efficiency, and may also disable cutting itself. In addition, there will be a trouble in that in order to return the cutting tool and the chamfering tool to the original positions thereof after the cutting operation is completed, it is necessary to reversely rotate the rotary body again or to perform an operation for returning the rotary body to the original position thereof using a separate reverse rotating means.

In addition, in the case of the cutting/chamfering apparatus of Prior Art 1, it is difficult to anticipate when the cutting tool and/or the chamfering tool become dull or are damaged so that workpieces may be frequently damaged due to the damage of the cutting tool and/or the chamfering tool. That is, in a case where a tool is in a dull or damaged state in the cutting/chamfering apparatus of Prior Art 1, the tool continuously digs into the workpiece by the rotation of the gear even though the workpiece is in a non-cut state due to the abnormal condition of the tool. As this state is repeated, load increases between the tool and the workpiece so that the load may cause the entire tool or the workpiece to be damaged.

In addition, the cutting/chamfering apparatus has problems in that it is impossible to process various shapes, it is impossible to cut a pipe material having a thickness that is thicker than a predetermined thickness, a damage may be caused by a collision between the gear and the finger stop, a cutting depth may not be adjusted, and a chamfering edge should be frequently replaced depending on a chamfering angle and shape. However, the problems are not solved.

These problems will be described in more detail with reference to a case in which Prior Art 1 processes a pipe material in an operating sequence as illustrated FIG. 3. That is, the cutting tool 31 and the chamfering tool 32 dig into the pipe material P as illustrated in the first drawing in FIG. 3, and processing is performed while causing the cutting tool 31 and the chamfering tool 32 to gradually and more deeply dig into the pipe material P in the order as illustrated in the second to fourth drawings so that the pipe material P is chamfered simultaneously with being cut. Accordingly, the processing of the pipe material by Prior Art 1 has a limit in that the processing capable of being performed by Prior Art 1 is confined to cutting as illustrated in FIG. 4A and cutting and one side chamfering as illustrated in FIG. 4B.

As illustrated in FIG. 5, it is natural that the cutting tool 31 for use in cutting a pipe material should have a length that is long as compared to the thickness t of a pipe material to be cut in order to cut the pipe material. However, when the length L of the cutting tool is increased in order to cut a pipe material having a thickness t of dozens of mm or more, the cutting tool may not withstand the force applied thereto and may thus be easily damaged.

In addition, as illustrated in FIG. 6, it is natural that the length lb of the edge of the chamfering tool 32 for improving and processing a cut surface of a pipe material should be longer than the length of an inclined surface of the pipe material. However, as illustrated in FIG. 7, since the length of the chamfering edge, lb, is substantially longer than the length of the cutting edge, lc, the chamfering edge should also endure considerable load corresponding to a force applied thereto.

In addition, it may be understood that Prior Art 1 is operated in a manner in which the cutting tool cuts the central portion by a predetermined value per every one rotation, and the load received when performing cutting and the load received when performing chamfering are different from each other, i.e., the cutting resistance P variably acts. Here, the cutting resistance P is determined by a specific cutting resistance Ks according to the quality of a material to be cut, a cut width l, and a processed depth dp, and may be expressed by an equation as follows.

$$P = K_s \times l \times dp$$

Accordingly, as illustrated in FIG. 7B, at the time of using a cutting tip for cutting, a pitch may be calculated by estimating the cut width lc and the processed depth dp while neglecting the specific cutting resistance according to the quality of the material to be cut. However, at the time of chamfering, as illustrated in FIG. 7A, because the cut width lb varies depending on the thickness of the pipe material, t, it is difficult to calculate a pitch value (a depth to be processed per one rotation) suitable for chamfering. Due to this reason, the chamfering may not satisfy various processing requirements, which makes commercialization difficult, and the chamfering tool is frequently damaged which may also cause a problem in mechanical design to overcome it.

A gear is engaged with a finger stop such that whenever the gear rotates by a predetermined angle, the cutting tool and the chamfering tool are lowered to perform cutting by a predetermined depth. When it is intended to cut and chamfer a pipe material having a thickness of dozens of mm, there is a problem in that the gear, the accessories below the gear, the finger stop, and so on may be damaged as the gear and the finger stop collide with each other hundreds of times. For example, assuming that the gear has five protrusions, the pitch at the time when the gear makes one rotation is 1 mm, and the thickness of the pipe is 20 mm, the finger stop and the gear will collide with each other 5 times in order to cut 1 mm from the pipe material, and will collide with each other by 100 times in order to process 200 mm. When such a processing is performed 100 times per day, the collision will occur 10,000 times, and when such a processing is performed for 100 days, the collision will occur 1,000,000 times. When such collision occurs during a high speed rotation, a considerably high impulse will be generated, which will exert a very harmful influence on the endurance of the apparatus.

In addition, in Prior Art 1, since the cutting is performed by a predetermined depth only when the finger stop is engaged with the gear, it is impossible to arbitrarily adjust the cutting depth and the range of choice of a workpiece is narrowed. That is, depending on the material of the workpiece or the kind of a tool, the cutting speed, the cutting depth, and so on are determined. However, Prior Art 1 may have a problem in that it cannot adjust the processing conditions even if such processing conditions exist.

In addition, the chamfering angle may vary depending on the kind and design of the pipe material. However, the Prior Art 1 has an inconvenience in that it is necessary to replace the chamfering tool in order to change the chamfering angle.

In order to overcome the problems of the prior art as described above, the inventor of the present application has researched measures that are capable of freely controlling forward and backward movements of a cutting tool, allowing the cutting tool to move not only in a direction perpendicular to a circular material to be cut, but also in an axial direction of the material to be cut so as to enable the processing of various shapes as well as cutting and chamfering, and are capable of simultaneously carrying out cutting and chamfering operations for a heavy pipe, such as a pipe material or a hard-to-cut material, having a thickness of dozens of mm or more.

In particular, the inventor has researched various measures for a method that is capable of freely controlling the movement of a tool within a rotary body. As a result, a first control method based on wireless communication, a second control method based on centrifugal force, and a third method based on hydraulic pressure have been proposed, and finally a control method using a rotational speed ratio have been proposed.

A tool control method based on wireless communication, which is the first proposed technique, is proposed by the applicant and the inventor of the present application in Korean Patent No. 1407327 (registered on Jun. 9, 2014), which is incorporated by reference, a tool control method based on centrifugal force, which is the second proposed technique, is also proposed in Korean Patent No. 1407328 (registered on Jun. 9, 2014), which is incorporated by reference, a tool control method based on hydraulic pressure, which is the third proposed technique, is proposed in Korean Patent No. 1415513 (registered on Jun. 30, 2014), which is incorporated by reference, and a tool control method using a rotational speed ratio is proposed in unpublished Korean Patent Application No. 2014-0066480 (filed on May 30, 2014), which is incorporated by reference.

Representative related techniques for the tool control method using a rotational speed ratio for a plurality of wheels, which is the fourth proposed technique, are as follows.

Prior Art 2: U.S. Pat. No. 5,605,083 (published on Feb. 25, 1997) (title of the invention: pipe cutting apparatus with differential speed rotatable ring cutter actuation), which is incorporated by reference.

Prior Art 3: JP Patent Laid-Open Publication No. 2001-096421 (published on Apr. 10, 2001) (title of the invention: pipe cutting apparatus), which is incorporated by reference.

Prior Art 4: JP Patent Laid-Open Publication No. 2003-117720 (published on Apr. 23, 2003) (title of the invention: pipe cutting apparatus), which is incorporated by reference.

Prior Art 5: EP 2085169A (published on Jul. 11, 2012) (title of the invention: pipe cut-off apparatus), which is incorporated by reference.

Prior Arts 2 and 5 were filed in the name of the invention to propose a method of controlling a movement of a tool according to a speed ratio between a rotary body and a ring gear by mounting the rotary body on the tool and then installing the ring gear, which is relatively rotated in relation to the rotary body, to be interlocked with the tool.

Prior Art 3 proposes a method of controlling a movement of a tool by mounting a plurality of planet gears within a rotary body, mounting a tool on the planet gears, and then causing the rotation of the planet gears to be relatively rotated in relation to the planet gears.

In addition, Prior Art 4 proposes a method of controlling a movement of a tool according to whether the tool is meshed with a specific gear in a two-stage composite gear by mounting a tool on a rotary body and then installing the two-stage composite gear interlocked with the tool within the rotary body.

In sum, it has been found that the prior arts related to the rotational speed ratio are provide with a rotary boy and a relatively rotated control wheel in order to control a vertical movement or a pivotal movement of a tool mounted on a rotary body, and a technique, which was intended to be proposed by the inventor, has already been known by the prior arts.

The items to be newly proposed by the inventor in relation to a tool control method using a rotational speed ratio in an orbital pipe cutting apparatus is related to a technique in which two or more tools are mounted on a rotary body, and then the two or more tools are selectively controlled. Prior Arts 2 to 5 cannot individually control one or more tools neither selectively nor independently.

DETAILED DESCRIPTION OF THE INVENTION

Technical Problem

The present disclosure is intended to provide an orbital cutting apparatus that is capable of freely and selectively controlling forward and backward movement of a plurality of cutting tools, allowing the cutting tools to move forward and backward and to move in an axial direction of a material to be cut so as to enable the processing of various shapes as well as cutting and chamfering, and is capable of simultaneously carrying out cutting and chamfering operations for a pipe material or a heavy pipe having a thickness of several tens of mm or more.

Technical Solution

In order to solve the problems as described above, the present disclosure provides an orbital cutting apparatus that is capable of freely and selectively controlling a plurality of cutting tools within a rotary body using a rotational speed ratio. The orbital cutting apparatus includes: a spindle rotating unit coupled to any one surface of a main body so as to rotate (C axis); a plurality of tool units coupled to reciprocate (X axis) toward a center of the spindle rotating unit on a front surface of the spindle rotating unit so as to cut and process a clamped material in an orbital manner; a relative movement unit coupled to the main body on an opposite side to the spindle rotating unit to be rotatable in synchronization with the spindle rotating unit, and configured to transmit a power to the plurality of tool units so as to cause the tool units to reciprocate; connection gears each formed at an end of each of driving shafts of the tool units so as to be selectively engaged with the relative movement unit so as to receive a power of the relative movement unit; an operation unit configured to cause a selected connection gear to be engaged with or be disengaged from the relative movement unit; and a control unit configured to control the movements of the spindle rotating unit and the relative movement unit.

At this time, the connection gear may be engaged with or disengaged from the relative movement unit while reciprocating on the end of the driving shaft by the operation unit so as to activate or deactivate a tool.

Here, the connection gear may be configured to repeatedly go in and out by a one touch manner by a pusher of the operation unit.

Alternatively, the operation unit may include pushers configured to horizontally reciprocate, and two pushers may be separately provided or dually configured in order to push the connection gear or to press a stopper that fixes the connection gear.

In addition, an initiation portion of the connection gear meshed with the relative movement unit has an outer diameter portion formed to be tapered such that a meshing gap may be generated when the connection gear and the relative movement unit are initially meshed with each other.

In addition, the control unit checks by a sensor whether the plurality of connection gears are engaged with or disengaged from the relative movement unit while rotating the spindle rotating unit once to several times so as to monitor a connection state of each tool.

In addition, the control unit may determine whether each of the connection gears is mounted at a correct position and may align the connection gears so as to re-mount each of the connection gears once through the operation unit.

The present disclosure may provide an orbital cutting apparatus that is capable of freely and selectively controlling a plurality of cutting tools within a rotary body using a rotational speed ratio. The orbital cutting apparatus may include: a spindle rotating unit coupled to any one surface of a main body so as to rotate; a plurality of tool units coupled to reciprocate toward a center of the spindle rotating unit on a front surface of the spindle rotating unit so as to cut a clamped material in an orbital manner; a relative movement unit coupled to the main body on an opposite side to the spindle rotating unit to be rotatable in synchronization with the spindle rotating unit, and configured to transmit a power to the plurality of tool units so as to cause the tool units to reciprocate; a control unit configured to control the movements of the spindle rotating unit and the relative movement unit. In the relative movement unit, a plurality of control wheels are connected with the plurality of tool units, respectively, and the plurality of control wheels are configured to be in synchronization with the spindle rotating unit so as to control the reciprocating movements of the tool units, respectively.

Here, the control wheels may be coupled with a fixing wheel so as to be fixed to the main body, and a free wheel is interposed between the control wheels so as to allow a bearing to freely move.

Preferably, the tool units of the orbital cutting apparatus may receive the power of the relative movement unit through the driving shaft so as to convert a rotational movement into a vertical reciprocating movement.

In addition, the main body may be configured to reciprocate in the longitudinal direction (Z axis) of the material by the control of the control unit.

In addition, the main body may be configured to move up or down depending on a caliber of the material.

In addition, the control unit may include a Human Machine Interface (HMI) touch screen configured to input or output movement and processing conditions of components.

In addition, the orbital cutting apparatus may further include a stand unit that is installed on each side or any one side of the main body in order to supply/discharge the material to/from the main body.

Here, the orbital cutting apparatus may further include a horizontal moving apparatus interposed between the stand unit and the main body and configured to reciprocate by a control of the control unit in order to precisely input or output the material to be supplied or discharged.

In addition, the orbital cutting apparatus may include a tool sensor configured to detect the positions of the cutting tools so as to present a reference point of a movement in an X-axis direction.

Here, the tool sensor may include a touch plate configured to detect whether a tool tip end of the corresponding tool unit is contacted, and the tool sensor may be installed to be detachable/attachable in order to sense the reference point after replacing the tool of the corresponding tool unit.

The orbital cutting apparatus of the present disclosure may include a clamping unit installed on each side or any one side of the main body so as to fix the material. The clamping unit may rotate a clamping wheel using at least one driver, and may move to be retracted or expanded such that a plurality of jaws may tighten the material by a rotation of the clamping wheel, and the clamping wheel or the driver may be provided with a scale configured to feedback a movement to the control unit so as to precisely control the movement of the clamping unit.

Here, the jaws may be configured to tighten the material by being retracted in the outside of the material or to tighten the material by being expanded in the inside of the material.

In addition, in the orbital cutting apparatus of the present disclosure, driving units of the spindle rotating unit and the relative movement unit may mutually monitor respective physical amounts of the counterparts so as to enhance precision in synchronization.

Advantageous Effects

The orbital cutting apparatus according to the present disclosure has an advantage in that a cutting tool mounted on a rotary body is capable of freely moving forward and backward by an external control.

The orbital cutting apparatus according to the present disclosure has an advantage in that one or more cutting tools provided in the orbital cutting apparatus are capable of moving toward the center of the pipe and in the longitudinal direction of the pipe while rotating about the material such that cutting of a material, as well as chamfering, surface cutting, and processing of a special shape, which are performed simultaneously cutting, can be performed.

The orbital cutting apparatus according to the present disclosure is capable of performing processing in a sequence of a "V-shaped" form, a "U-shaped" form, a "dually improved" form, and so on by one tool even in the processing of simultaneously chamfering and cutting a heavy pipe or a material having a thickness of several mm to dozens of mm. Thus, for a thickness within a range where the cutting tool may be lowered, any material can be cut in various shapes at a high speed by one tool.

The orbital cutting apparatus according to the present disclosure uses standard cutting tools, and thus, has an economic advantage in terms of maintenance and management as compared to the prior art that uses an expensive chamfering tool that should cut a relatively wide surface at once. In addition, there is an advantage in that the chamfering may be performed in a range which may be freely set without replacing chamfering tools depending on a chamfering angle as in the prior art.

The orbital pipe cutting apparatus according to the present disclosure may freely fix a nonlinear material, which has not be processed in lathe processing, and may then process to a desired shape so that the apparatus may be used instead of the lathe.

The orbital pipe cutting apparatus according to the present disclosure may enable factory automation by inputting information related to a material to be processed, a processing method, a processing condition, a processed shape, and so on.

BRIEF DESCRIPTION OF THE DRAWINGS

FIG. 3 illustrates operation processes sequentially in each of which cutting and chamfering are performed simultaneously in the pipe cutting and bevel machine according to Prior Art 1;

FIGS. 4A-4B are side views illustrating an example of processing that may be conducted in the pipe cutting and bevel machine according to Prior Art 1;

MODE FOR CARRYING OUT THE INVENTION

Figure 1:
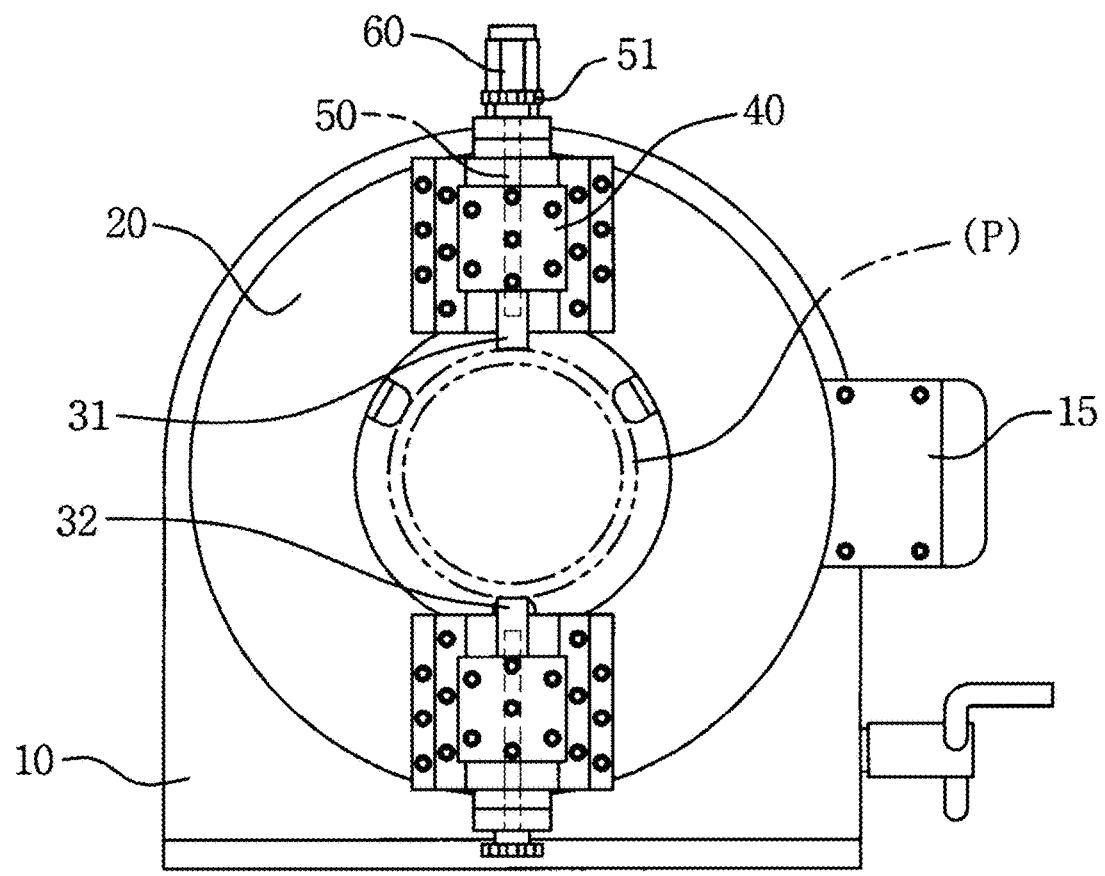
FIG. 1 is a front view illustrating a pipe cutting and bevel machine according to Prior Art 1.
Figure 2:
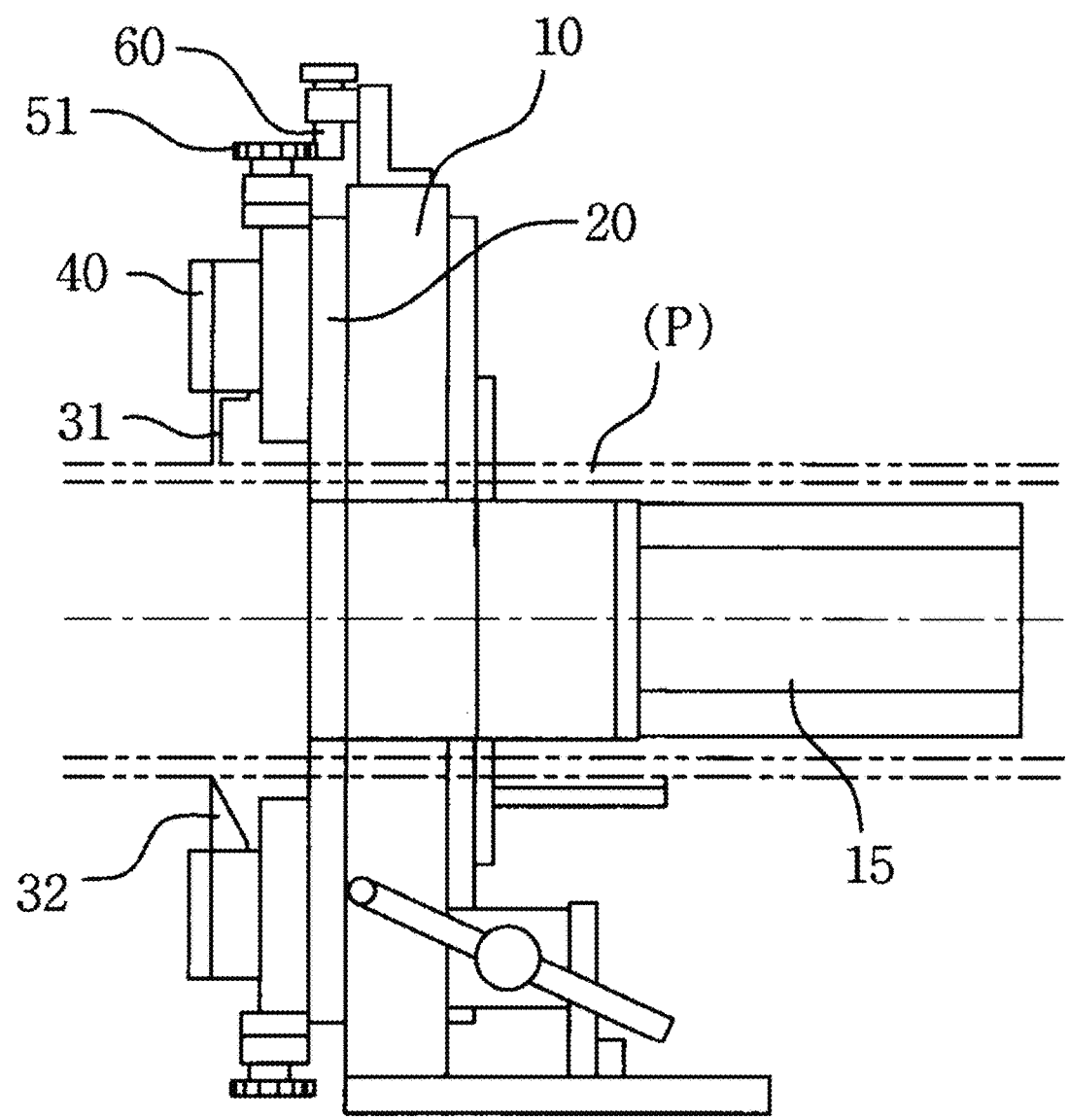
FIG. 2 is a side view illustrating the pipe cutting and bevel machine according to Prior Art 1.
Figure 5:
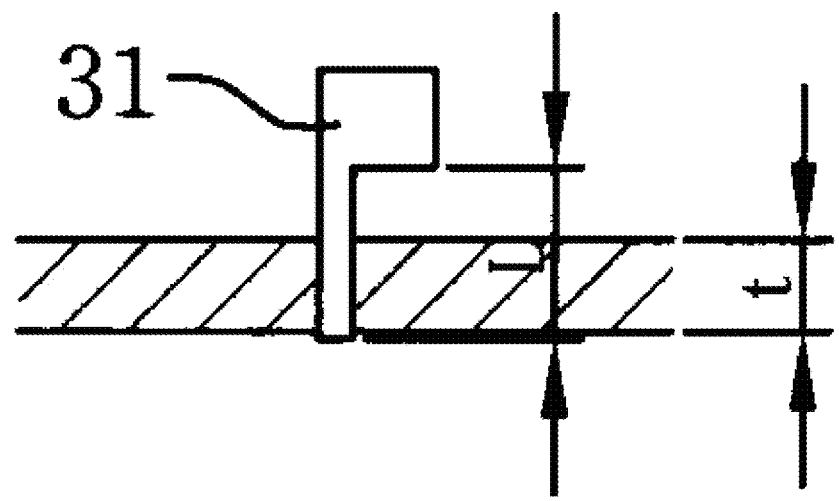
FIG. 5 is a side view illustrating a relationship between a length of a cutting tool and a thickness of a pipe material in the pipe cutting and bevel machine according to Prior Art 1.
Figure 6:
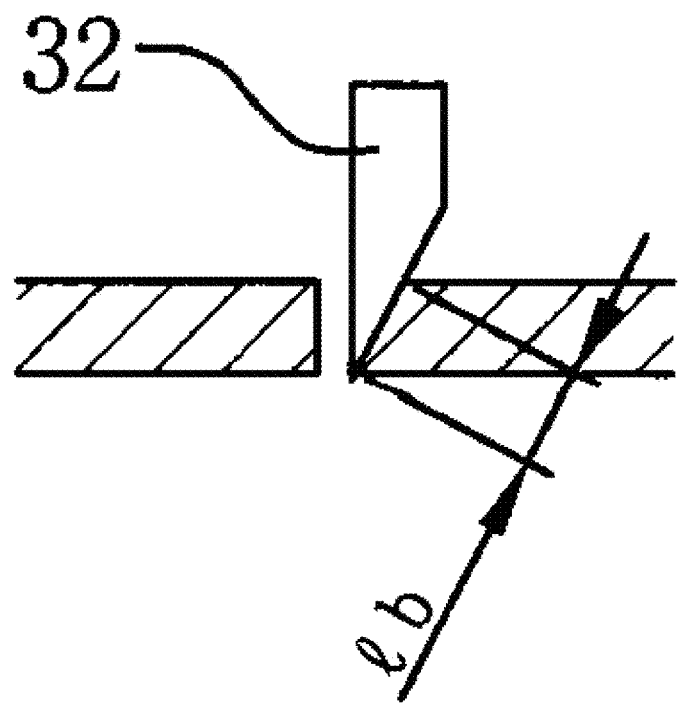
FIG. 6 is a side view illustrating a relationship between a length of a chamfering tool and a thickness of a pipe material in the pipe cutting and bevel machine according to Prior Art 1.
Figure 7A:
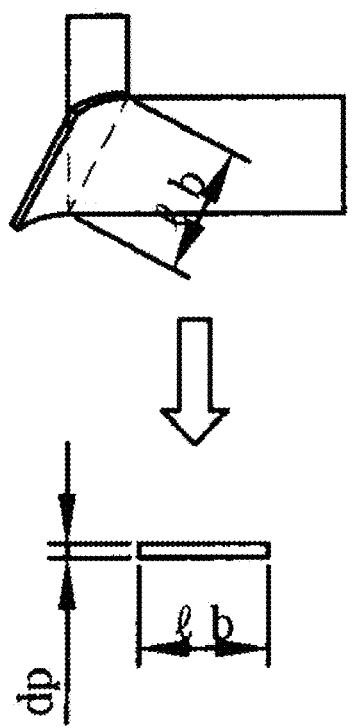
FIGS. 7A-7B are views illustrating a relationship of forces applied to the chamfering tool when cutting is performed as illustrated in FIG. 6.
Figure 7B:
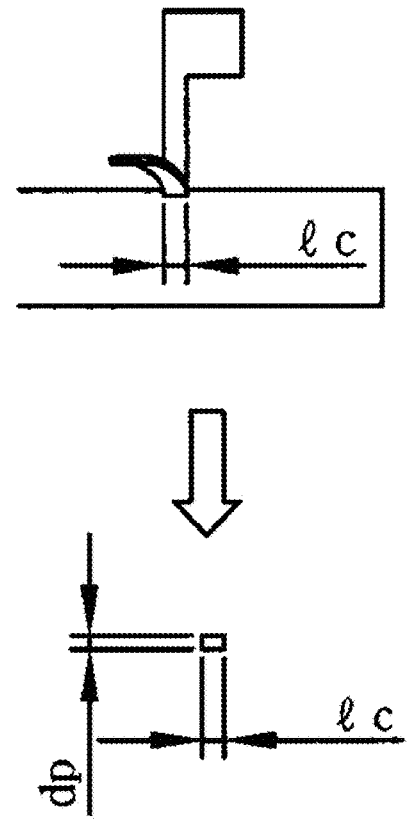

As a basic configuration, the orbital cutting apparatus according to the present disclosure includes a spindle rotating unit configured to mount a tool thereon in order to cut a material in an orbital manner and a relative movement unit installed close to the spindle rotating unit and configured to transmit a power to the tool so as to cause the tool move to forward or backward with respect to the material side, and the relative movement unit and the spindle rotating unit are synchronized with each other. Accordingly, by adjusting the rotating speed of the relative movement unit to be proportional to the rotating speed of the spindle rotating unit, the entrance, the retract, and stop of the tool may be freely controlled by the power transmitted from the relative movement unit even while the tool revolves around the material following the spindle rotating unit.

The orbital cutting apparatus according to the present disclosure includes a plurality of tools, and is configured to be capable of freely and selectively controlling one or more of the plurality of tools. According to the method of controlling the plurality of tools as described above, the first embodiment is characterized in that one or more of the plurality of tools are selectively simultaneously controlled, and the second embodiment is characterized in that each of the tools is independently controlled.

The present disclosure may include two or more axes depending on the direction of movement for cutting a tool. That is, a rotational movement (main component force) that generates a force to cut a material by a tool by the rotational movement of the spindle rotating unit will be referred to as a "C axis" movement, and a reciprocating movement (thrust cutting force) that makes the tool move forward or backward with respect to the material by the rotational movement of the relative movement unit will be referred to as an "X axis" movement. In addition, the main body, to which the spindle rotating unit is coupled, may be fed along the longitudinal direction of the material, and such a horizontal reciprocating movement (feeding component force) of the main body will be referred to as a "Z axis" movement.

The cutting force, radial force, and feed force are terms frequently and mainly used in lathe processing that cuts a rod material and a pipe material. In the lathe processing, a rod material is engaged in a spindle and then rotated at a high speed, and a cutting tool is moved forward to apply the cutting force and the radial force to the rotating rod material such that the rod material is subjected to cutting processing.

In that event, because the lathe should rotate a material, such as a rod material, at a high speed, there is a limitation in applying the processing according to the rod material in a straight line shape and a thickness of the rod material. That is, because the rod is rotated at a high speed, the use of an off-centered rod is limited in order to maintain a precise concentricity, and thus, the lathe is not used at all in the processing of a cam shaft, a non-linear material, or the like.

However, in the case of the orbital cutting apparatus according to the present disclosure, the tool unit is rotated around the material by the spindle in the state where the material is fixed. Thus, it is not necessarily required to adjust the concentricity of the material as in the lathe, and further many of restrictions for the shapes of the material or the like are removed so that the orbital cutting apparatus according to the present disclosure may be used in a technique corresponding to the lathe processing.

Hereinafter, an orbital cutting apparatus that is capable of freely and selectively controlling a plurality of cutting tools within a rotary body by using a rotational speed ratio according to an embodiment will be described with reference to the accompanying drawings.

First Embodiment

Figure 8:
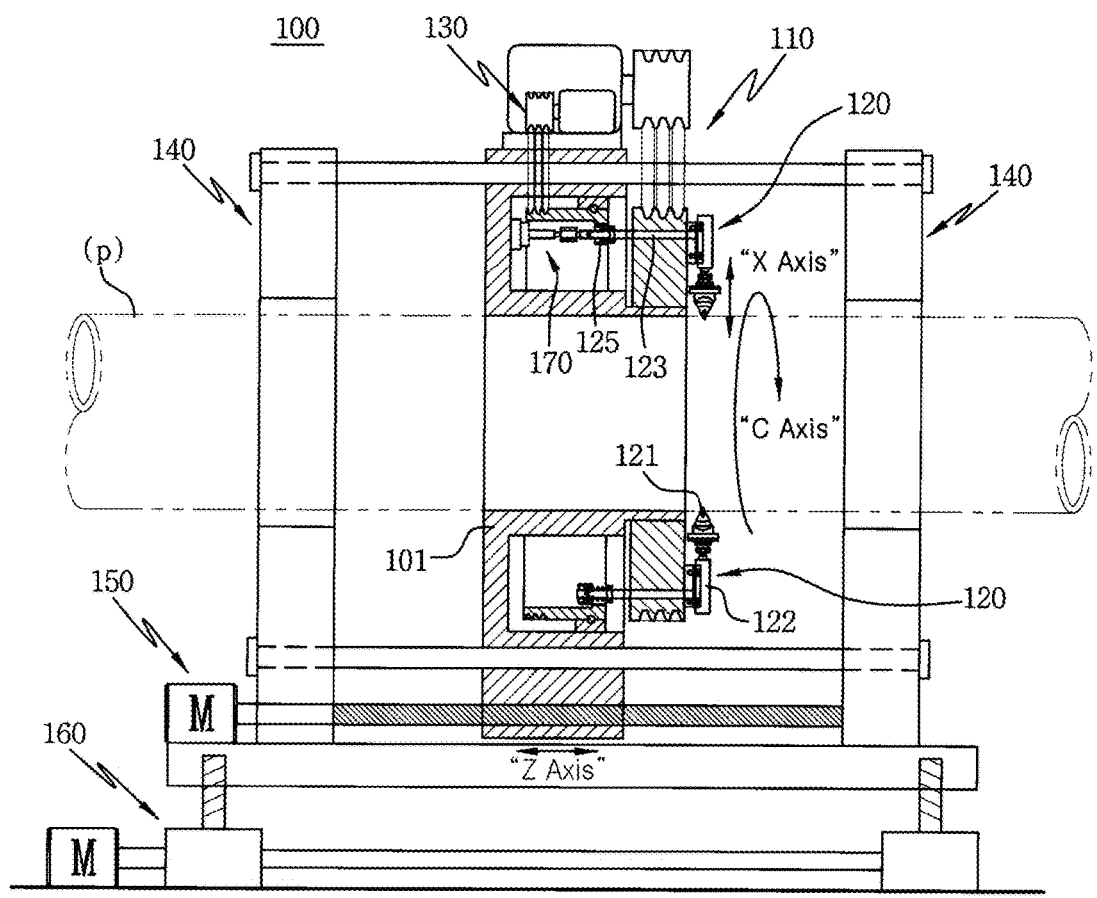
FIG. 8 is a view illustrating an orbital cutting apparatus according to a first embodiment of the present disclosure.
Figure 9:
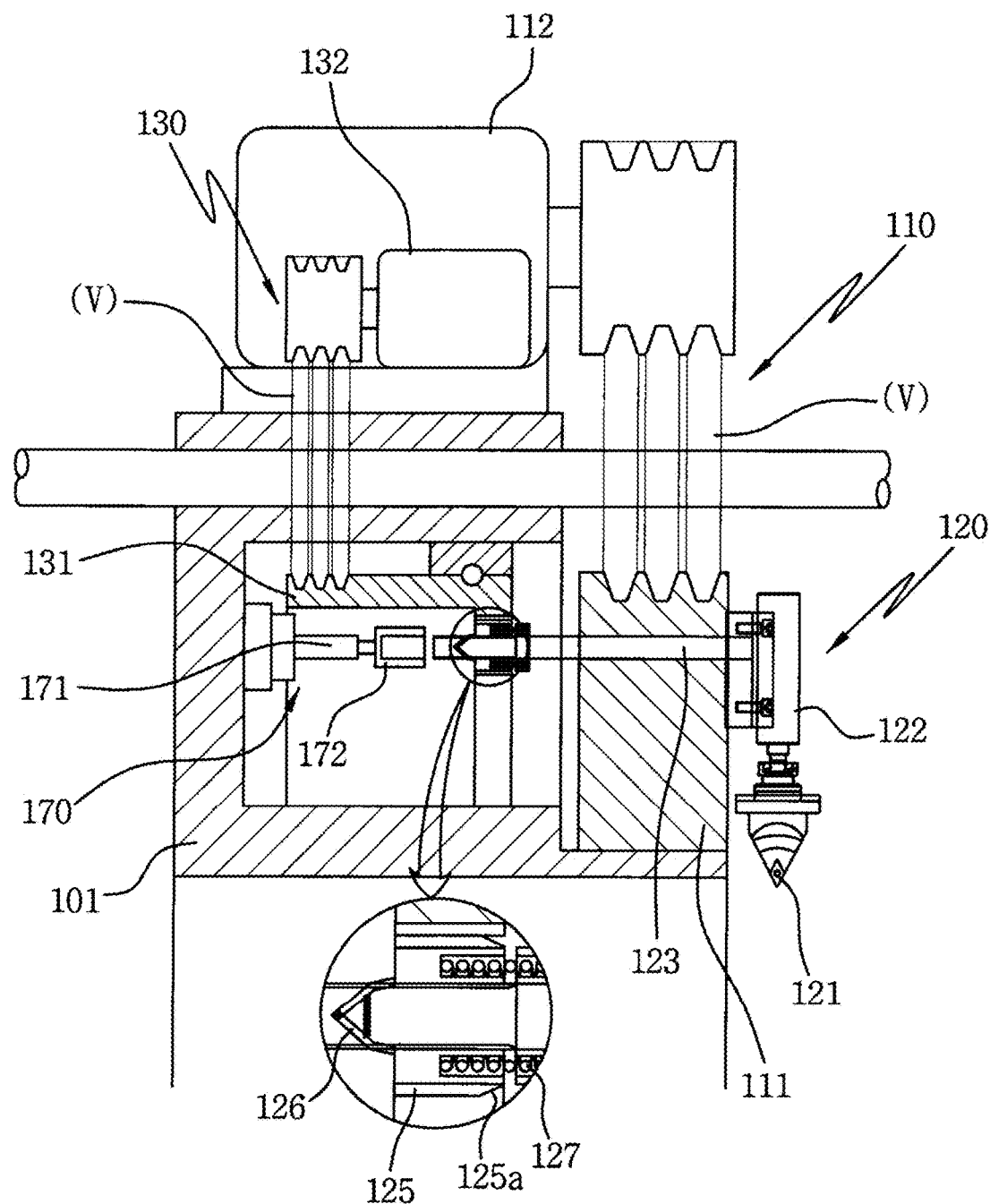
FIG. 9 is a view illustrating main parts of a spindle rotating unit and a relative movement unit in an enlarged scale.

FIG. 8 is a view illustrating an orbital cutting apparatus according to a first embodiment of the present disclosure, and FIG. 9 is a view illustrating main parts of a spindle rotating unit and a relative movement unit in an enlarged scale.

Referring to FIGS. 8 and 9, an orbital cutting apparatus 100 according to a first embodiment of the present disclosure includes a main body 101, a spindle rotating unit 110, a plurality of tool units 120, a relative movement unit 130, a manipulating unit 170, a clamping unit 140, and a control unit, which are to be essentially provided to the orbital cutting apparatus 100. The spindle rotating unit 110 and the relative movement unit 130 are synchronized by the control unit.

First, a material to be used in the present disclosure will be briefly described. A material p to be used may be an elongated pipe material or rod material as illustrated in the drawings, and such a pipe material or rod material may have a circular shape or an angled shape. In addition, the material p is not necessarily limited to an elongated straight line shape, and any product (e.g., an elbow having a bent shape) may be used as long as the product is capable of being positioned at the center of the main body 101. While the embodiment of the present disclosure has exemplified a pipe as the material in order to help the sufficient understanding, it is noted that the material may not be a pipe.

The main body 101 serves as a base that includes various components, such as the spindle rotating unit 110 and the relative movement unit 130, that are installed inside and outside the main body 101. The main body 101 may have a shape that is determined depending on arrangement and coupling conditions of constituent elements or the like, without being limited to a specific shape. In that event, the center of the main body 101 takes a perforated form such that the material p penetrates therethrough. Alternatively, although not illustrated in the drawings, when the orbital cutting apparatus according to the present disclosure is used as a dedicated apparatus that only processes an end face of the material, the main body 101 may not take the perforated form through which the material penetrates.

The spindle rotating unit 110 is installed on any one surface of the main body 101.

The spindle rotating unit 110 is configured to perform a "C axis (main component force)" movement so as to cut the material, includes a driving wheel 111 rotatably mounted on the main body 101, and is rotated by a separate spindle driving unit 112. The spindle driving unit 112 may be, for example, an electric motor, and a servo motor may be preferably used in order to be synchronized with the relative movement unit so as to precisely control the relative movement unit. The spindle driving unit 112 and the driving wheel 111 may be configured to be connected to each other via various power transmission units, such as a gear, a belt, and a chain, so as to transmit power. In an embodiment of the present disclosure, a spindle pulley is formed on the driving wheel 111, and a timing belt V is wound around the spindle pulley and the spindle driving unit 112 so as to interconnect the spindle pulley and the spindle driving unit 112.

The driving wheel 111 of the spindle rotating unit 110 is provided with a plurality of tool units 120 configured to cut the material p.

When two or more tool units 120 according to the present disclosure are provided, a processing of a specific shape may be completed without changing tools. Of course, it is possible to process a desired shape with one tool unit through repeated operations. However, it is proposed to install at least two tool units as a basic configuration in consideration of balance according to the rotational movement and effectiveness in processing.

Each of the tool units 120 includes a tool holder 122 coupled to perform a "X axis (thrust cutting force)" movement toward the center of the driving wheel 111 in front of the driving wheel 111, and a cutting tool 121 mounted on the end of the tool holder 122, and further includes a driving shaft 123 configured to receive the rotational movement of the relative movement unit 130 at the rear side of the driving wheel 111, and a movement conversion unit configured to receive the rotational movement of the driving shaft 123 so as to make the tool holder 122 rectilinearly move.

As the movement conversion unit, Prior Art 2 may be exemplified, in which a direction of a rotational movement is changed, and then the rotational movement is converted into a rectilinear movement using a ball screw. However, any movement conversion unit may be adopted in an embodiment of the present disclosure as long as it has a mechanism of converting a rotational movement into a rectilinear reciprocating movement. The present disclosure does not particularly propose any mechanism other than the existing movement conversion mechanism. Accordingly, descriptions of a specific configuration and actions for the movement conversion unit will be omitted.

A connection gear 125 is formed on the driving shaft 123 of each of the above-described tool units 120 to receive the rotational movement of the relative movement unit 130. Each connection gear 125 is selectively connected to the corresponding tool unit 120 while performing horizontal reciprocating movements such that the corresponding tool unit 120 is connected with the relative movement unit 130 so as to be activated, or is not connected with the relative movement unit 130 so as to be deactivated. Such a connection gear 125 is engaged with the driving shaft 123 to be capable of performing the horizontal reciprocating movement while having a high restraint force in a rotating direction, and is designed to perform a reciprocating movement by a force applied from the outside. That is, the connection gear 125 is of a one-touch type such that the connection gear 125 is pushed backward and then stopped by one push, and to be protruded forward and then stopped by the next push.

For example, a push button type may be exemplified which goes in and out in a one-touch manner. In addition, the first pushing may push the connection gear 125 such that the connection gear 125 may be moved and then stopped, and the second pushing may push a stopper fixing the connection gear 125 such that the fixing of the connection gear 125 may be released. In addition, a pusher may be made to be rotated, and the rotational movement may cause the connection gear 125 to move as rectilinear reciprocating movements via a ball screw.

Figure 10A:
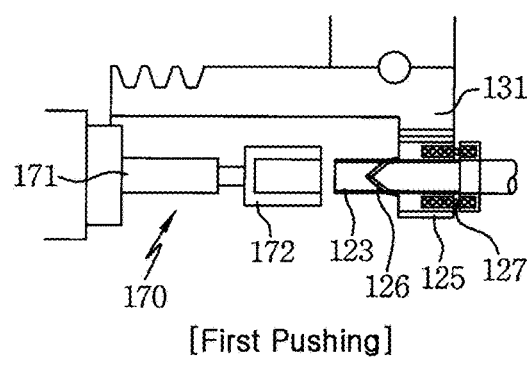
FIGS. 10A-10B are views illustrating states in each of which a connection gear is activated or deactivated.
Figure 10B:
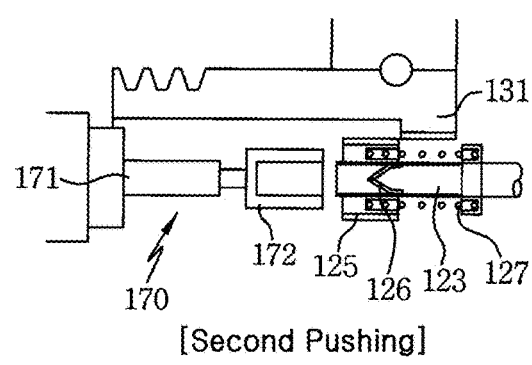

FIGS. 10A-10B are views illustrating states in each of which a connection gear is activated or deactivated. As illustrated in the drawing, an embodiment of the present disclosure is implemented in the form corresponding to the second example among three examples as described above. That is, in a state in which a force of pushing the connection gear 125 to the end of the driving shaft 123 is generated by a reaction force of the spring 127, the connection gear 125 is pushed to the inside of the driving shaft by an external pusher such that the connection gear is moved backward (first pushing), a stopper 126 seated inside the driving shaft 123 may bound upward to block the front of the connection gear 125 so as to stop the connection gear 125. In addition, when the stopper 126 is pushed at this time by the second pushing of the pusher, the connection gear 125, which has been moved backward, is released from the stopper 126, which causes the connection gear 125 to be moved forward by the reaction force of the spring 127.

As illustrated in the enlarged view of FIG. 9, the connection gear 125 according to the present disclosure may have a tapered inclined surface 125a formed on one side of the connection gear 125, i.e. an initiation portion where the connection gear 125 starts to be meshed with the control wheel 131. Such a tapered inclined surface 125a is provided in order to ensure that each tooth of the connection gear 125 enters between the gear teeth of the control wheel 131 such that the connection gear 125 is meshed with the control wheel 131 even if the teeth of the connection gear 125 are not correctly aligned with the gear teeth of the control wheel 131 when the connection gear 125 is engaged with the gear of the control wheel 131. Additionally describing, in order to cause the connection gear 125 to be activated, it is necessary to shift the connection gear 125 from the second pushing state as illustrated in FIG. 10A to the first pushing state. When the positions of the teeth are not correctly aligned in such a shifting process, interference may be caused to prevent the connection gear 125 from being inserted. Accordingly, when each gear tooth is formed as a tapered inclined surface 125a at the front end portion of the connection gear 125, the gear tooth is reduced by the tapered angle, and thus, when the front end portion enters, a large gap is provided so that a smooth connection may be achieved.

Next, the relative movement unit 130 will be described, which is synchronized with the spindle rotating unit 110 so as to cause the tool unit 120 to perform rectilinear reciprocating movements.

Referring to FIGS. 8 and 9 again, the relative movement unit 130 may include the control wheel 131 rotatably coupled to the main body 101 and meshed with the connection gear 125 of at least one tool unit 120, and a driving shaft 132 configured to rotate the control wheel 131. In the embodiment of the present disclosure, a servo motor is selected as the driving unit 132, a belt pulley is formed on the control wheel 131, and the driving unit 132 and the belt pulley are connected by a timing belt V. Of course, besides the timing belt, various power transmission units, such as a gear, a belt, and a chain that are exemplified in the spindle rotating unit 110 may also be used for the connection.

Such a control wheel 131 includes an inner wheel gear having teeth formed on an inner peripheral surface thereof so that at least one connection gear 125 is meshed with the inner periphery of the inner wheel gear. Alternatively, such a control wheel 131 may include an outer wheel gear having teeth formed on an outer peripheral surface thereof so that at least one connection gear 125 is meshed with the outer periphery of the inner wheel gear. That is, it is determined whether the connection gear 125 and the control gear 131 are circumscribed or inscribed in consideration of a connection relationship between constituent elements thereof and a structural stability, but the contact direction is not specified to any one direction.

Next, the operation unit 170 configured to cause the connection gear 125 to be selectively engaged with or disengaged from the control wheel 131 of the relative movement unit 130 will be described with reference to FIG. 10.

The operation unit 170 may be configured to have a pusher function that pushes the connection gear 125 as presented above in the embodiment of the connection gear 125. That is, in the first pushing, the operation unit 170 functions to push the connection gear 125, and in the second pushing, the operation unit 170 functions to block the connection gear 125 and presses the stopper 126.

As described above, the operation driver 171 configured to perform a rectilinear movement of two pushes is required, and a hydraulic or pneumatic cylinder, a linear motor, or the like may be used as the operation driver 171. Alternatively, the activation and deactivation of a selected connection gear 125 refers to driving a connection gear selected after the spindle rotating unit 110 is stopped in the state where the connection gear is stopped at a predetermined position of the operation unit 170, and thus the operation driver is not necessarily configured to be automatically driven. Thus, a manually operable push lever or handle may also be adopted. However, since the orbital cutting apparatus according to the present disclosure aims at complete automation, the operation driver 171 using a hydraulic or pneumatic cylinder or a linear motor is desirable.

A pusher 172 configured to push the connection gear 125 is mounted on a rod tip end of such an operation driver 171. At this time, depending on the type of the connection gear 125, the pusher 172 may be a single pusher or dual pusher or may have two operation units. That is, when the connection gear 125 is configured to go in or out each time when it is pushed once in a one-touch manner, the first pushing and the second pushing may be performed by one single pusher.

In addition, in the case of an embodiment in which the connection gear 125 is pushed at one time and the stopper 126 is pressed at another time, the pusher may be implemented in a form of a dual pusher. That is, when pushing the connection gear 125, the inner diameter of the dual pusher may be larger than the driving shaft and smaller than the outer diameter of the connection gear, and when pushing the stopper 126, the inner diameter of the dual pusher may correspond to the outer diameter of the driving shaft 123. The form of the stopper 126 has not been described in detail while describing the connection gear 125 above. Since the stopper 126 is formed with a tilted inclined surface, when the dual pusher moves forward, the inner surface of the pusher gradually pushes the stopper 126 while riding on the inclined surface. Thus, all the stoppers 126 are formed to move downward when the end of the pusher comes close to the connection gear 125. Accordingly, after the inner and outer diameters of the dual pusher are made to be suitable for this condition, a groove may be formed in the inner diameter to selectively push or not to push the stopper 126. The groove, which pushes or does not push the stopper 126, may be configured such that the dual pusher is rotated by a predetermined angle so that the rotational movement of the dual pusher may be performed in an automatic or manual mode.

In addition, rather than making the above-described dual pusher dually overlap with one, a first pushing operation unit configured to push the connection gear 125 and a second pushing operation unit configured to press the stopper 126 may be separately placed on any moving line of the revolving main body 101 in which the driving shaft 123 revolves such that the activation and deactivation of the connection gear selected by each unit may be performed.

Next, the clamping unit 140 configured to fixedly clamp the material p to be subjected to cutting processing will be described.

The clamping unit 140 may be formed on each side or any one side of the main body 101. That is, when cutting or processing a middle portion of an elongated material, since it is necessary to fix the material at the opposite sides of the main body 101 after the material passes through the main body 101, the clamping unit 140 should be formed on each side of the main body 101. When processing any one end face of a material, it is sufficient if only one side, rather than both sides, is fixed.

Figure 11:
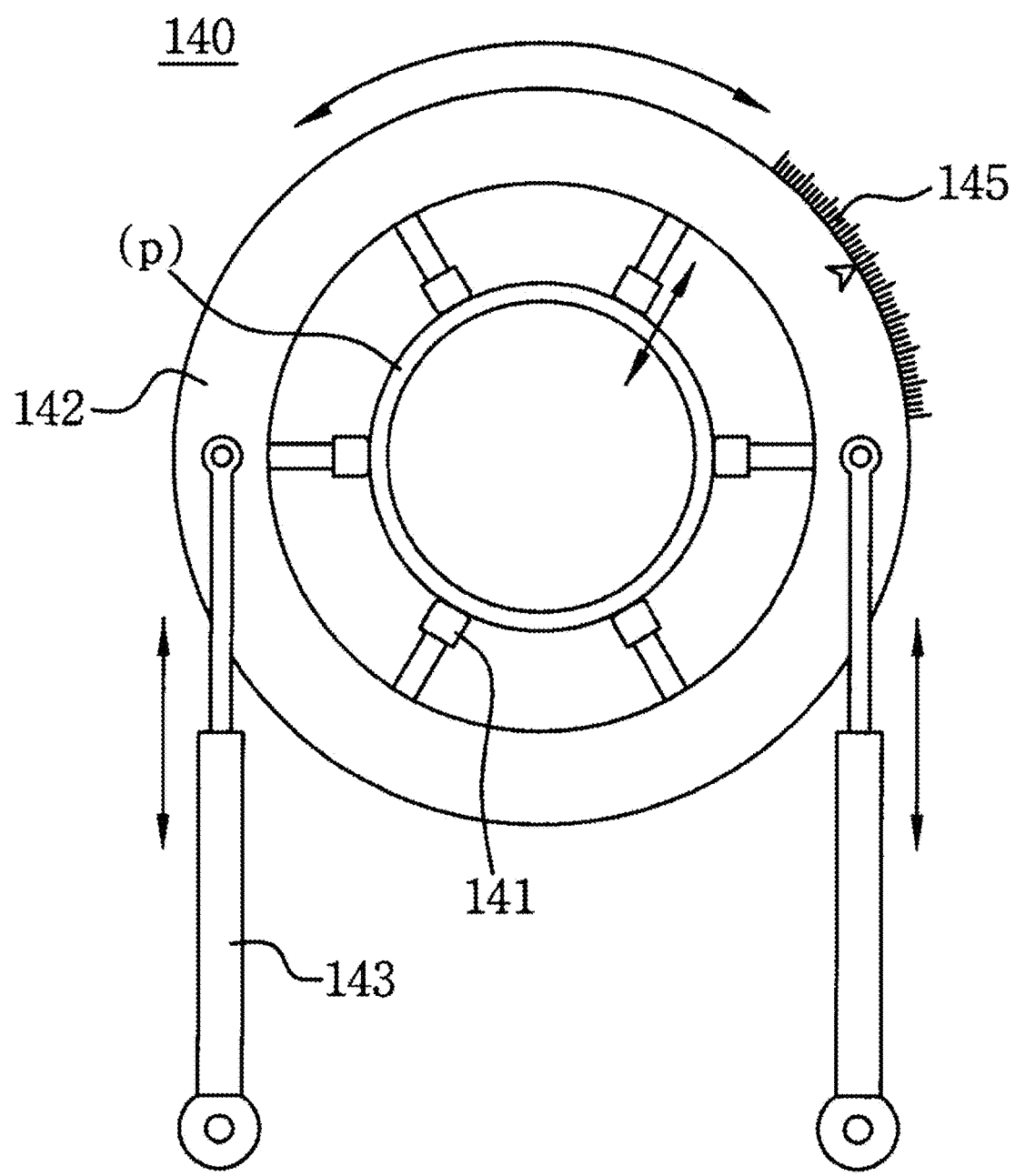
FIG. 11 is a view schematically illustrating a clamping unit.

FIG. 11 is a view schematically illustrating the clamping unit. Referring to this drawing, the clamping unit 140 according to the present disclosure includes a plurality of jaws 141, a clamping wheel 142 configured to move the jaws 141 to be retracted or expanded at once, and a driver 143 configured to rotate the clamping wheel 142 by a predetermined angle. The configuration of the clamping unit 140 may adopt, for example, the technique proposed in Prior Art 1, and a person ordinarily skilled in the art may implement the clamping unit to be the same as or similar to Prior Art 1. Thus, detailed descriptions of the clamping unit will be omitted. However, the clamping unit 140 in the present disclosure further includes a scale 145 configured to sense the movement of the clamping unit 140 and to feedback the movement to the control unit. Such a scale 145 may be an angular scale configured to sense the rotation of the clamping wheel 142 or a linear scale configured to sense the movement of the driver 143.

Next, a configuration, which enables the orbital cutting apparatus according to the present disclosure to perform a "Z axis (feeding component force)" movement, will be described.

Referring to FIGS. 8 and 9, the above-described main body 101 is installed on a ground or a bed, and may be configured to have a feeding component force by reciprocating the main body 101 in the longitudinal direction of a material. Accordingly, a feeding unit 150, such as an LM guide, a ball screw, or a driver, may be constructed under the main body 101 such that the main body 101 may be moved in the Z axis direction under the control of the control unit. In an embodiment of the present disclosure, a servo motor is used as a driver of the feeding unit 150 to be precisely controlled.

Besides the clamping unit 140 for supporting the material p, the orbital cutting apparatus according to the present disclosure may include a stand unit configured to supply the material p to the clamping unit 140 or to receive the material discharged from the clamping unit 140.

Figure 12:
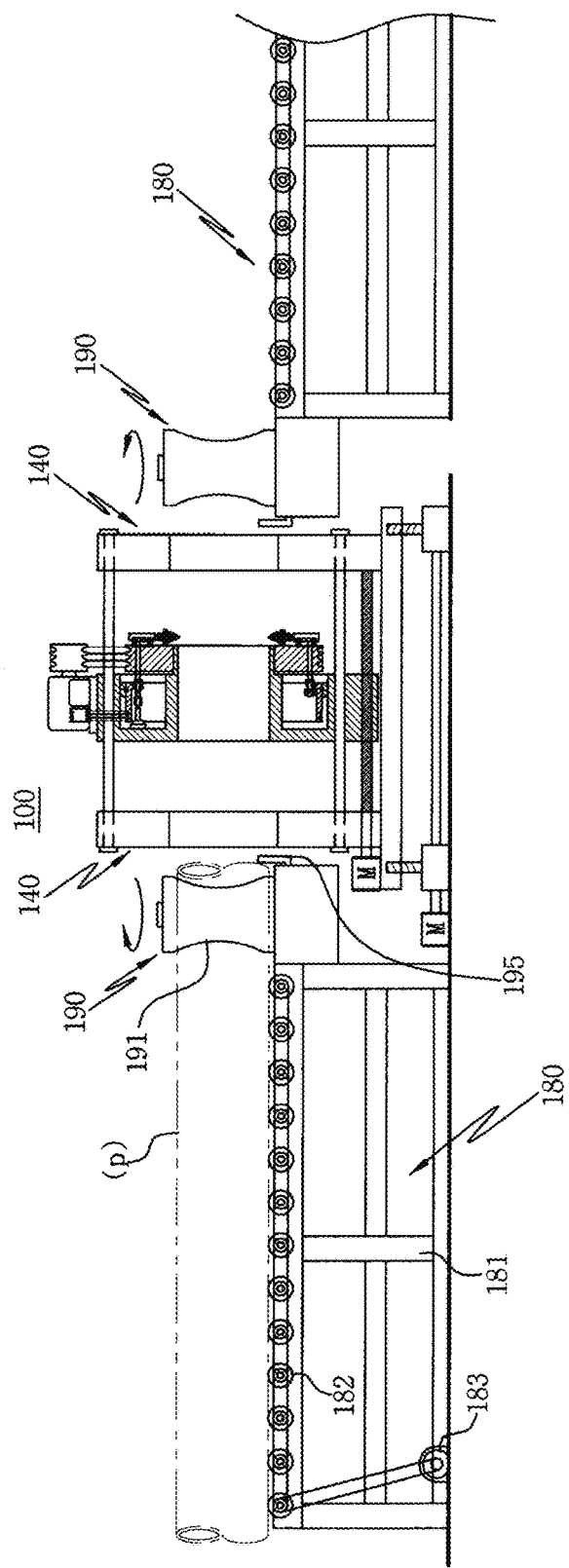
FIG. 12 is a view illustrating a state in which a stand unit and a horizontal moving device configured to supply/discharge a material to/from the orbital cutting apparatus according to the present disclosure.

FIG. 12 is a view illustrating a state in which a stand unit and a horizontal moving device configured to supply/discharge a material to/from the orbital cutting apparatus according to the present disclosure.

Referring to FIG. 12, the stand unit 180 is not an essential element for the orbital cutting apparatus of the present disclosure, but may serve as an element for factory automation. That is, in an operation of moving a heavy pipe, it is difficult to feed the heavy pipe only with man power or a crane and a forklift. Accordingly, when the material is received from a weight loader and is laid on the stand unit 180, the material is moved to the main body 101 by rollers or a conveyor of the stand unit 180.

Accordingly, the stand unit 180 is provided with elongated steel-frame supports 181 which are horizontally arranged, pipe rollers 182 which are formed on the top surfaces steel-frame supports 181, and a drive motor 183 that turns the pipe rollers 182.

In addition, the orbital cutting apparatus according to the present disclosure may further include a horizontal moving apparatus 190 between the stand unit 180 and the main body 101.

The horizontal moving apparatus 190 performs an operation of correctly moving the material p fed from the stand unit 180 to a position where the material p is to be processed. Accordingly, the horizontal moving apparatus 190 includes a feeding roll 191 configured to convey the material such that a feeding distance per hour is constantly output and a reference detector 195 configured to sense the initiation and termination of material feeding.

The reference detector 195 senses the instance when the material passes through the reference detector 195 and sends the detected result to the control unit, and the controller calculates the number of revolutions of the feeding roll 191 and time based on the value sent from the reference detector 195 so that the feeding value of the material can be correctly controlled. While an optical sensor is used as the reference detector 195 in the embodiment, other sensing techniques, such as a limit switch, a proximity sensor, and an image camera, may be used in substitution for the optical sensor.

In addition, both of the reference detector 195 and the feeding roll 191 are configured to be operated under the control of the control unit so as to enable automation. Alternatively, in the case of a short material which does not require a continuous operation, a manually operated handle may also be used in order for an operator to horizontally move the material while viewing the material with the naked eye.

Next, the control unit, which controls the orbital cutting apparatus according to the present disclosure, and principal movements to be executed by the control unit will be described.

The main function of the control unit is to control a relative movement unit by synchronizing the spindle rotating unit 110 and the relative movement unit 130 with each other such that, while a "C axis" movement of a cutting tool 121, which cuts the material, is performed by the spindle rotating unit 110, the "X axis" movement of the cutting tool 121 is simultaneously performed. In addition to the "C axis" movement and the "X axis" movement, a feeding unit 150 for a "Z axis" movement is also synchronized such that all the moving directions of the tool are freely controlled.

The orbital cutting apparatus 100 according to the present disclosure are made to enable processing in two axes (X axis and Z axis) in addition to the spindle (C axis) processing in order to process the material p in various forms.

For reference, in the heavy pipe related industry, it is requested that an improvement operation required for groove welding form a "V-shaped" welding groove, a "U-shaped" welding groove, a "dually improved" welding groove, or the like as shown in Table 1. That is, an "I-shaped" welding groove is formed in a welding method that is mainly used in a case where the thickness of a pipe is 3 mm or less, and may be stably welded without an improvement operation. However, in a case where the thickness of the pipe material is gradually increased, the "V-shaped" welding groove may be adopted up to 20 mm, but the welding groove should be "U-shaped" or should be formed in a "dually improved" shape.

TABLE 1

Example of Sectional Shape in Welding Groove Improvement Operation according to Thickness of Pipe

| Shape of Welding Groove | Sectional Shape of Welding Groove | Thickness of Applied Pipe |
| --- | --- | --- |
| I-shaped |  | t < 3 mm |
| V-shaped |  | t = 6~19 mm |
| U-shaped |  | t > 20 mm |
| Dually Improved |  | t > 40 mm |

The requests of such an improved operation have not been achieved in conventional cutting apparatuses and other cutting/chamfering apparatuses, and thus, a manual operation with a grinder should be additionally performed.

However, in the orbital cutting apparatus 100 according to the present disclosure, it is possible to form any shapes of welding grooves required for such groove welding so that factory automation can be achieved.

Figure 13:
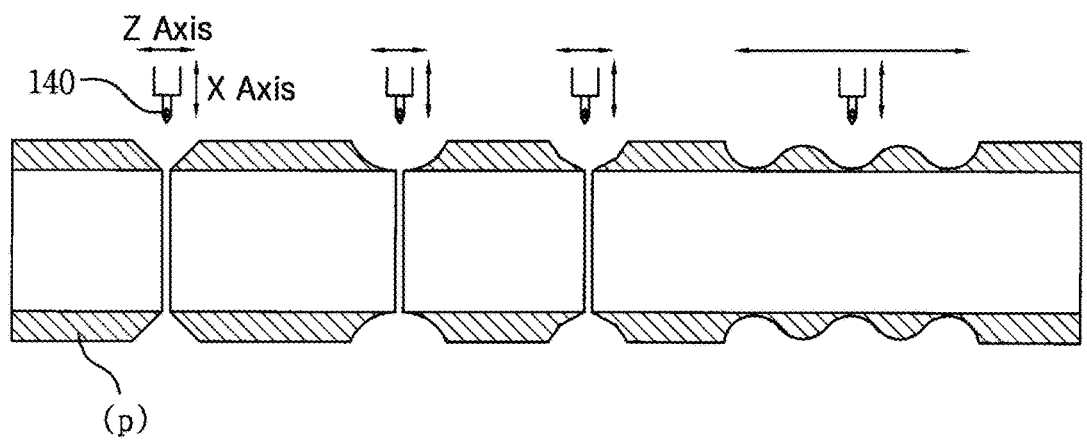
FIG. 13 is a view illustrating an example of processing that may be performed using the orbital cutting apparatus according to the present disclosure.

FIG. 13 is a view illustrating an example of processing that may be performed using the orbital cutting apparatus according to the present disclosure. As can be seen from the first processing exemplification figure of FIG. 13, simultaneously with cutting, an improvement operation may be performed on the cut surface in a diagonal direction (processing of a "V-shaped" welding groove). In addition, as can be seen from the second processing exemplification figure, simultaneously with cutting, an improvement operation may be performed in a round form (processing of a "U-shaped" welding groove). In addition, as can be seen from the third processing exemplification figure, "a dually improved" welding groove may be processed, and as can be seen from the fourth processing exemplification, a special shape can be processed.

Figure 14:
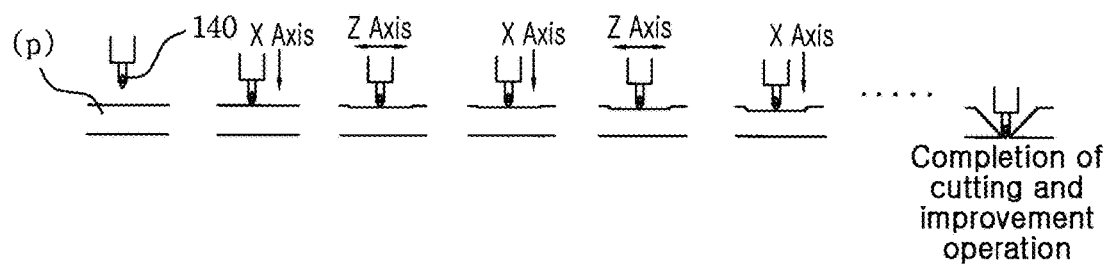
FIG. 14 is a view illustrating a processing method that is of performing an improving operation in an oblique direction simultaneously with cutting as in the first exemplification in FIG. 13.

FIG. 14 is a view illustrating a processing method that is of performing an improvement operation in an oblique direction simultaneously with cutting as in the first exemplification in FIG. 13.

Referring to FIGS. 8 and 9, a cutting tool 121 is positioned at a portion to be processed on a material p, as illustrated in FIG. 14. In order to position the cutting tool at a portion to be processed on the material, a method of operating the feeding unit 150 to move the main body 101 and a method of moving a material using a horizontal moving apparatus 190 of the material may be selected.

After the processing position is set as described above, the spindle rotating unit 110 is rotated for processing. In that event, when the spindle rotating unit 110 is rotated, the driving shaft 123 mounted on the spindle rotating unit 110 and meshed with the relative movement unit 130 is relatively rotated, and consequently, the cutting tool 121 is moved. Accordingly, the control wheel 131 of the relative movement unit 130 is rotated by the number of revolutions, which is the same as that of the driving wheel 121, and thus, when the driving shaft 123 is controlled not to rotate, the cutting tool 121 is stopped without moving.

When the spindle rotating unit 110 is rotated to perform the "C axis" movement, the control wheel 131 of the relative movement unit 130 is controlled to rotate faster such that the cutting tool 121 is moved forward to the material p while performing the "X axis" movement. In that event, a proper depth should be determined in consideration of the cutting conditions according to the kind and thickness of the material.

The spindle rotating unit 110 and the relative movement unit 130 of the orbital cutting apparatus according to the present disclosure may have not only a synchronization function but also a mutually monitoring function. That is, assuming that making one have a predetermined rotation speed according to the rotation speed of the counterpart refers to synchronization, the mutual monitoring means monitoring a physical change amount of the counterpart in adverse in order to actively correspond thereto. For example, when the cutting tool performs a cutting movement in the "C axis" or the "X axis", load may be momentarily increased depending on the state and cutting depth of the tool. The load is received from a corresponding motor, and a peak current or the like may be changed depending on the load. Accordingly, synchronization can be performed more actively and precisely while mutually monitoring the physical amounts, such as a peak current, that are received from the motor of the counterpart.

Next, in the state where the X-axis movement is stopped, the main body 101 is fed in the Z axis direction so as to perform processing. In this event, the moving distance in the Z axis direction may be easily obtained by being calculated in advance based on the thickness t and the improved angle (degree) of the material. By repeatedly performing the X axis direction processing and the Z axis direction processing several times to dozens of times, it is possible to complete desired cutting and chamfering operations.

As described above, the cutting apparatus 100 of the present disclosure is, as illustrated in FIG. 14, a type of moving forward into a gradually narrowed inside from a wide outside surface when performing an improvement operation simultaneously with cutting, and thus, the cutting tools do not need to have a length that is proportional to the thickness of a pipe material as in Prior Art 1. That is, in the cutting apparatus 100 of the present disclosure, the moving distance of the cutting tool 121 in the X axis direction becomes a factor for determining the thickness of the pipe material. In addition, since the cutting apparatus 100 according to the present disclosure may rotate the driving wheel 111 at a high speed, it is possible to complete a processing operation within a short time even if the processing sequence is complicated.

Figure 15:
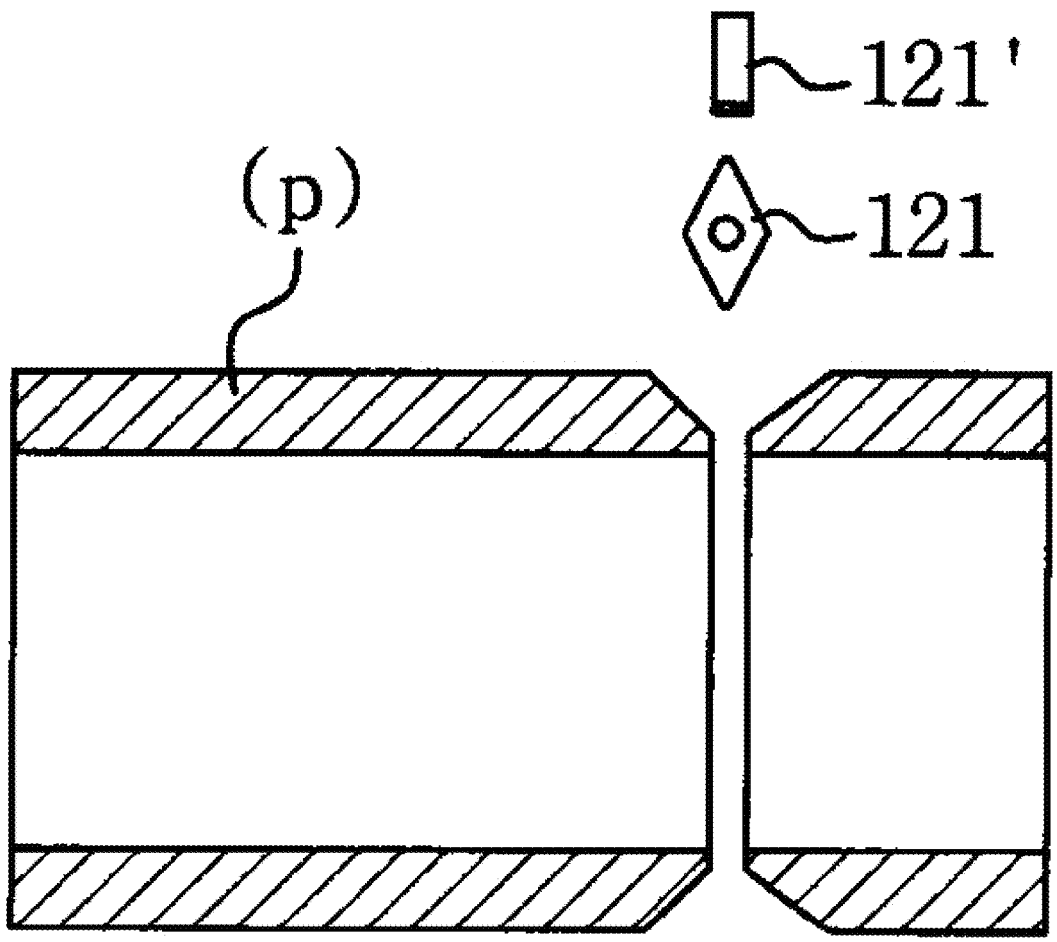
FIG. 15 is an exemplary view for describing a case in which a plurality of cutting tools are needed for the orbital cutting apparatus according to the present disclosure.

FIG. 15 is an exemplary view for describing a case in which a plurality of cutting tools are needed for the orbital cutting apparatus according to the present disclosure.

The orbital cutting apparatus 100 according to the present disclosure includes a plurality of cutting tools 121, and is configured such that at least one of the plurality of cutting tools 121 is activated. Accordingly, respective cutting tools 121 may be used for different operations. For example, any one of the cutting tools may perform a cutting operation and another cutting tool may perform a chamfering operation. For example, as can be seen from FIG. 15, the cutting tool 121 may be improper for vertical cutting. Accordingly, a finishing operation is enabled only when the tool for vertical cutting is replaced. Thus, different types of cutting tools 121 and 121' may be mounted on the tool units 120 for a continuous processing such that a processing operation can be performed to be adopted to a purpose.

In addition, the orbital cutting apparatus according to the present disclosure is difficult to continuously perform an operation for a long time using only one tool when the material is a thick and hard-to-cut material. Accordingly, it is possible to mount various kinds of tools, to increase the cutting amount per one time with a rough cutting tool whose edge is not consumed well, and then to finish smoothly with a middle cutting tool or a finish cutting tool.

Alternatively, in the case where the material is a pipe, outer diameter processing tools and inner diameter processing tools may have different shapes. Thus, when a plurality of tools are mounted on the tool units 120 for both of the inner diameter processing and the outer diameter processing, the tools may be selectively used without replacing the tools.

In the case where cutting and chamfering are simultaneously performed or a plurality of cutting edges are used for rough cutting, middle cutting, and finish cutting, a corresponding cutting edge may perform processing once, then the next cutting tools move forward to repeatedly perform processing twice or third times. However, when the cutting edges are set to move forward with a time difference by setting the cutting edges to height phase differences, the processing may be performed only once and then finished.

As described above, the cutting tools 121 move in the "C axis", "X axis", and "Z axis" directions by the control of the controller, and thus, it is necessary to set a reference position for a precise processing. Basically, the positions of tools are stored in the servo motors of the spindle rotating unit 110 and the relative movement unit 130, but an error may occur in the positions when the tools are replaced. Accordingly, it is necessary to set a position of a tool after the tool is replaced.

The tool setting may be simply performed when an optical sensor is used in the outside of the tool. However, in the present embodiment, a touch sensor will be used for a more precise measurement.

Figure 16:
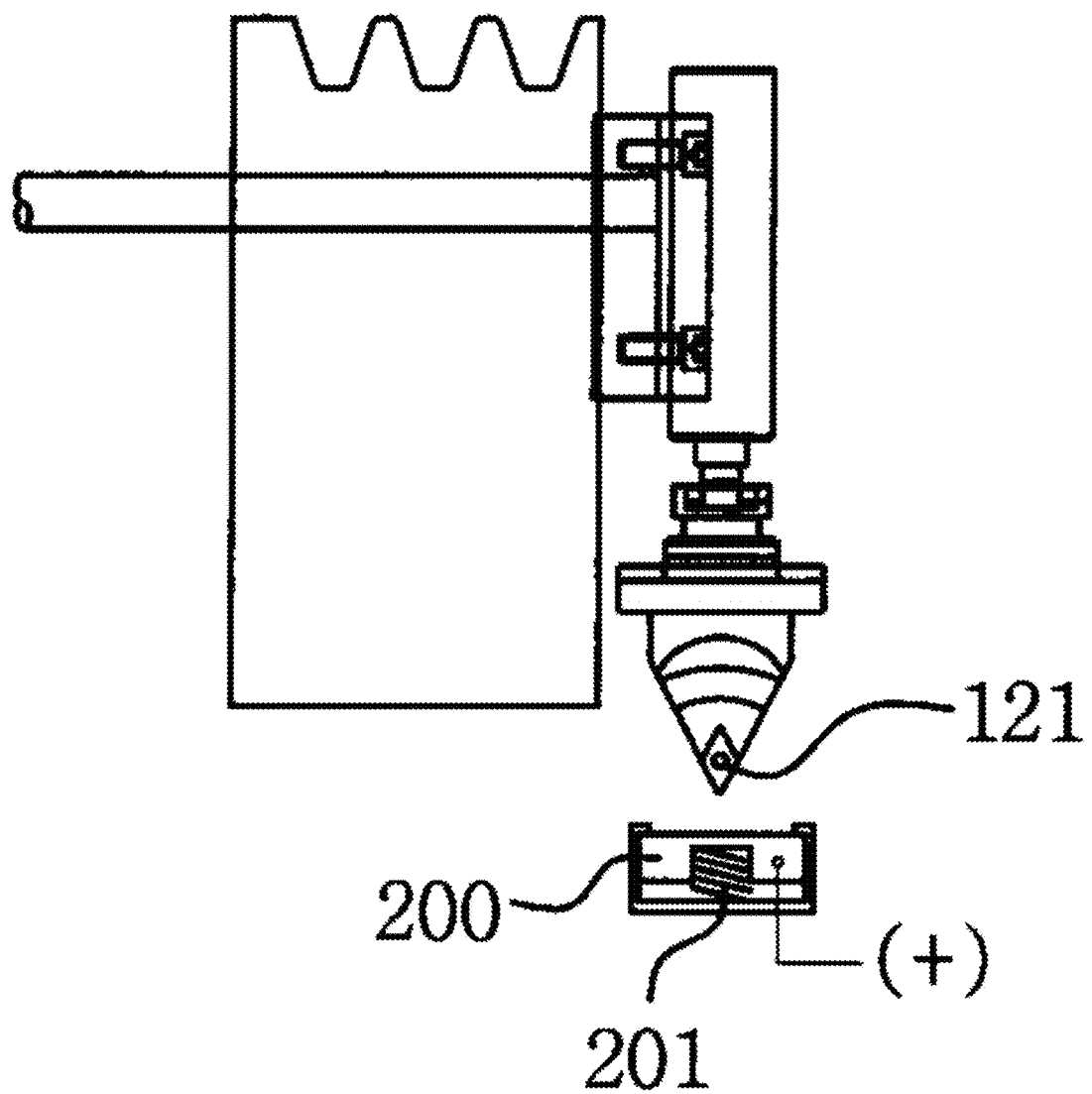
FIG. 16 is a view illustrating a touch sensor for tool setting.

FIG. 16 is a view illustrating a touch sensor for tool setting. As illustrated in this figure, when a touch plate 200 is removably mounted in front of, or below the replaced cutting tool 121, and the tool is gradually lowered so that the tip end of the tool comes in contact with the touch plate 200, the control unit recognizes it and stores a reference position. The touch plate 200 is used only when it is attached to the main body 101 below the tool or the clamping unit 140 in front of the tool to be set.

The principle of the touch sensor is as follows: the control unit recognizes when a positive (+) current flows to the touch plate 200 and the negative (−) current basically flowing in the tool and the cutting apparatus comes in contact with the touch plate 200. In this event, the touch plate 200 may be configured to be elastically supported by a spring 201 in order to prevent the cutting tool 121 from being damaged when the cutting tool 121 comes in contact with the touch plate 200.

In addition, the control unit takes charge of all the controls for the automation of the orbital cutting apparatus 100, and includes a touch screen for convenient input and output. The touch screen may be configured as a Human Machine Interface (HMI) in consideration of the user's convenience.

A control method for the scale of the clamping unit 140, which has not been described in the description of the embodiment of the present disclosure, will be briefly described.

Materials clamped by the clamping unit 140 have various standards, and the clamping pressure may vary depending on the various materials. The material clamping pressure may be adjusted by the driver of the clamping unit 140. However, an action of retracting widely expanded jaws 141 at once in order to clamp a material having a small diameter may be performed after the jaws are retracted in advance to a portion close to the outer diameter to be clamped because the material is not positioned at the center of the jaws, but is seated below the center.

Figure 17:
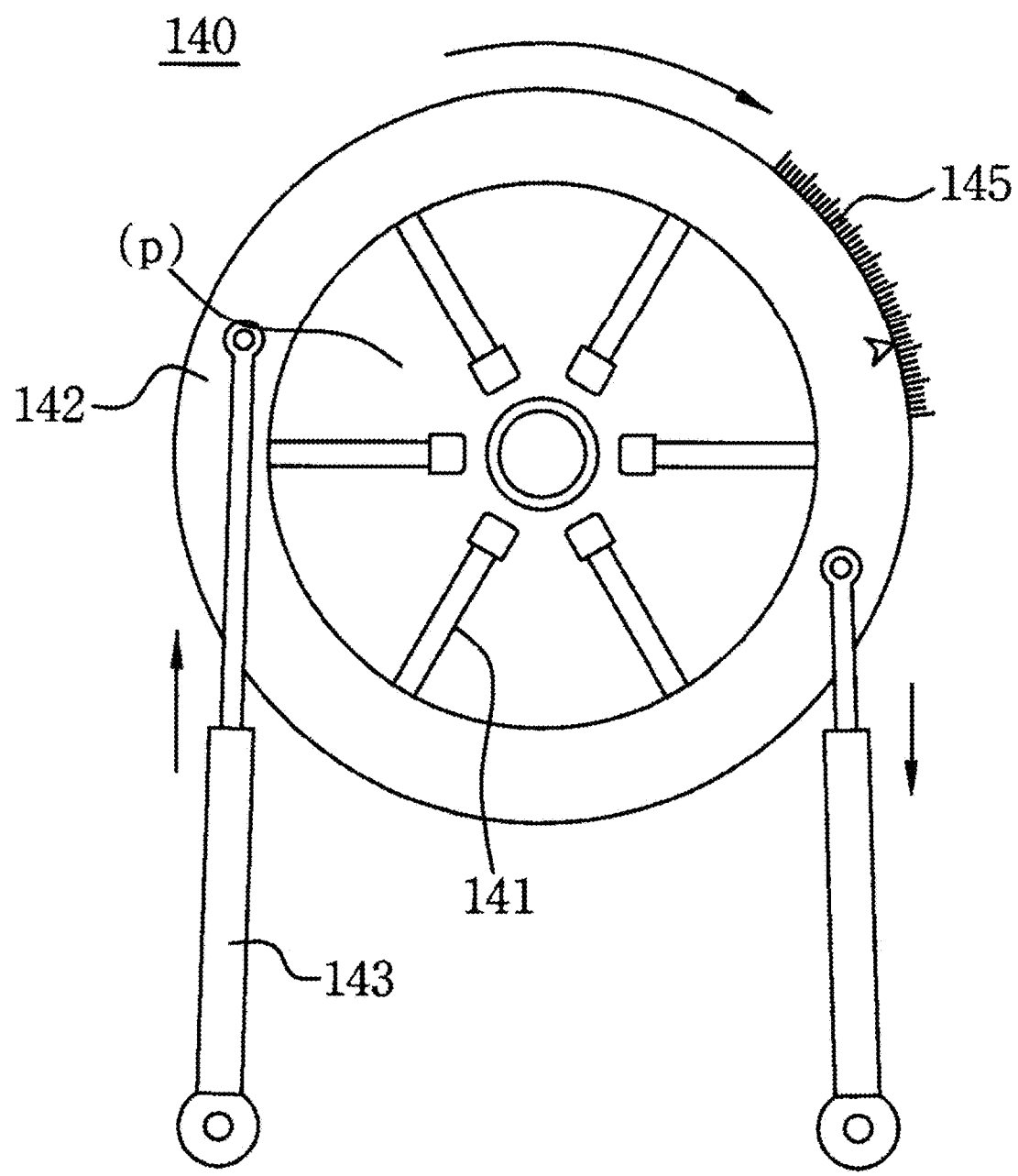
FIG. 17 is a view for describing actions of a jaw and a scale when gripping a material.

FIG. 17 is a view for describing actions of a jaw and a scale when gripping a material. As shown in the figure, the control unit controls the driver 143 based on the feed-back of the scale 145 to a position close to the outer diameter of the material, of which the value is input to the control unit.

In addition, as described above, in a case where various kinds of materials with different calibers are used, a case may occur in which the height at the side of the stand unit 180 and the horizontal moving apparatus 190 are not equal to the height at the side of the main body 101 and the clamping unit 140. That is, because the axial centers of the materials placed on the stand unit 180 and the horizontal moving apparatus 190 vary depending on the calibers of the materials, it is necessary to provide a measure to make the centers conform to the main body 101 side in order to use the various kinds of material. Such centering is enabled by the action of moving up and down the main body 101 or the action of moving up and down the stand unit 180.

In the embodiment of the present disclosure, the main body 101 is configured to be moved up and down. That is, as illustrated in FIG. 8, a lift unit 160 is provided below the feeding unit 150 of the main body 101 so as to move up and down the main body 101 by a predetermined height from the ground. Such a lift unit 160 may be programmed to be automatically controlled by the control unit when a standard of a material is input, and may be manually operated so as to adjust the height thereof.

In that event, it would be more preferable if the lift unit 160 is set to make the main body 101 and the clamping unit 140 horizontal to the stand unit 180 and the horizontal moving apparatus 190 and the clamping unit 140 is integrated with the main body 101. Without being integrated, they may be installed together with a separate bed so as to move up or down at once.

Figure 18:
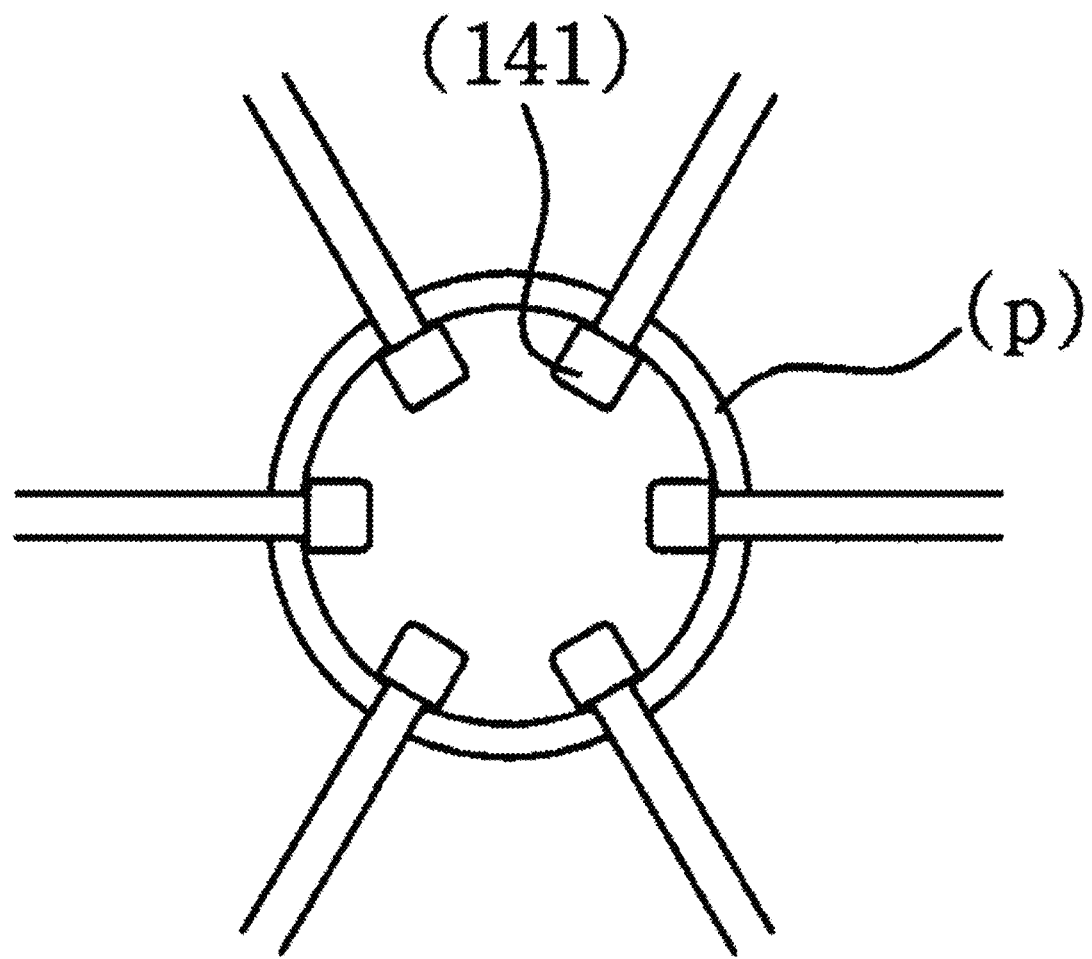
FIG. 18 is a view of the retracted jaws inserted into the inner diameter of the material.

In addition, there may occur a case in which a piece type material, which is short to be difficult to be sufficiently clamped. In such a case, since the jaws 141 are configured to be retracted or expanded, rather than to be replaced with separate jaws, so as to clamp a material, as illustrated in FIG. 18, it may also possible to insert the retracted jaws 141 into the inner diameter of the material p and to cause the jaws 141 to clamp the material p by expanding the jaws 141.

The orbital cutting apparatus according to the present disclosure may have a tool state confirmation function and a tool alignment function. First, the tool state confirmation function will be briefly described.

In the orbital cutting apparatus according to the present disclosure, it is memoried by the control unit which tool is activated or deactivated, but the memory function may be lost by sudden discharge or the like. Even if memoried, it will be one of methods for stably operating the apparatus to check the current states of the tools at the initial step for operating the apparatus. Accordingly, it is sensed through a sensor where the position of a connection gear 125 exists while gradually turning the spindle rotating unit 110, and the current state of the tools is checked depending on the position. For this purpose, it is sensed, through various sensing techniques using an optical sensor, an image sensor, or ultrasonic waves, whether the connection gear 125 is located at the first pushing position or the second pushing position, and the sensed result is sent to the control unit.

In addition, it shall be understood that the tool alignment function refers to mounting the tools again based on the above-mentioned tool state confirmation or the memory. That is, among the plurality of tools, some tools may be frequently used, and some tools may not be frequently used for a long period of time. The tools, which are not frequently used for a long period of time, may be deviated from a mounting position when they are left as they are, and thus the deviation of the mounting position may be corrected by mounting the tools again through the tool alignment function. Accordingly, each of the connection gears is made to go in or out repeatedly by an operating unit according to the control of the control unit so that the tools are mounted again.

Second Embodiment

Figure 19:
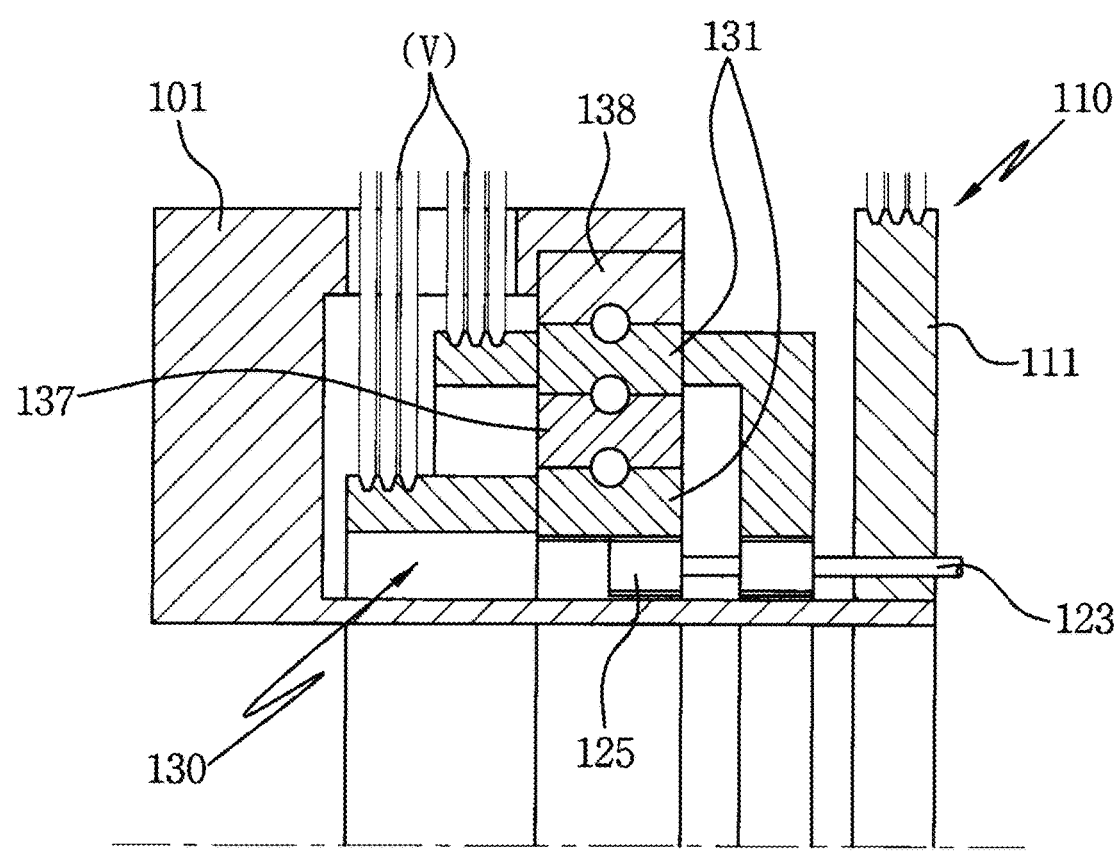
FIG. 19 is a view illustrating only a main part of an orbital cutting apparatus according to a second embodiment of the present disclosure.

FIG. 19 is a view illustrating only main parts of an orbital cutting apparatus according to a second embodiment of the present disclosure.

Referring to FIG. 8 of the first embodiment and FIG. 19, the orbital cutting apparatus according to the second embodiment of the present disclosure proposes to independently control the plurality of tool units 120 by partially deforming the form of the relative movement unit 130 from the configuration of the first embodiment.

Although the relative movement unit in the first embodiment is configured such that a plurality of tool unit drive shafts are connected to one control wheel, in the second embodiment, each of individual control wheels 131 is connected to one of the tool unit driving shafts 123. Accordingly, the control wheels 131 are needed by the number of the driving shafts 123, and driving units (not illustrated) for rotating the control wheels are needed by the number of the driving shafts 123.

For such a configuration, a plurality of control wheels 131 are configured to inwardly and outwardly overlap with each other to be independently moved, and a gear is formed on the inner or outer surface of each of the control wheels 131 to be meshed with each of the driving shafts 123. A plurality of driving units, each of which is formed of a servo motor, are connected to the control wheels 131, which are respectively meshed with the driving shafts 123 by a timing belt V, at the opposite side to the control wheels 131, thereby precisely controlling the rotational movement of the control wheels 131. Of course, the driving units are synchronized with the spindle rotating unit 110 to be controlled by the control of the control unit as in the first embodiment.

In order to make the plurality of control wheels 131 overlap with each other, because a bearing interposed therebetween should be freely rotated regardless of the rotating directions or rotating speeds of the control wheels 131, a free wheel 137, which is not restrained by any control wheel 131 or bearing, is coupled between the control wheels 131. A fixed wheel 138 for supporting the control wheels 131 to the main body 101, the free wheels 137, and so on is coupled between the control wheels 131 and the free wheels 137 or the innermost area or the outermost area.

The relative movement unit 130 of the second embodiment configured as described above may independently control the plurality of tool units by controlling only the number of revolutions of the driving unit without needing a separate operating unit.

Except for the differences in configuration described above, various sensing methods and controls are similarly applied to the orbital cutting apparatus according to the second embodiment of the present disclosure, descriptions for the control methods or the like will be omitted.

While descriptions have been made with reference to the embodiments of the present disclosure, a person ordinarily skilled in the art can understand that the present disclosure may be variously modified and changed without departing from the technical idea and scope of the present disclosure.

The invention claimed is:

1. An orbital cutting apparatus that is capable of freely and selectively controlling a plurality of cutting tools within a rotary body using a rotational speed ratio, the orbital cutting apparatus comprising:
   a spindle rotating unit coupled to any one surface of a main body so as to rotate (C axis);
   a plurality of tool units coupled to reciprocate (X axis) toward a center of the spindle rotating unit on a front surface of the spindle rotating unit so as to cut a clamped material in an orbital manner;
   a relative movement unit coupled to the main body to be rotatable in synchronization with the spindle rotating unit, and configured to transmit a rotational power from the relative movement unit to the plurality of tool units so as to cause the plurality of tool units to reciprocate;

each tool unit of the plurality of tool units includes a connection gear formed at an end of a driving shaft so as to be selectively engaged with the relative movement unit so as to receive the rotational power of the relative movement unit;

an operation unit configured to cause one of the connection gears to be engaged with or be disengaged from the relative movement unit; and a control unit configured to control movements of the spindle rotating unit and the relative movement unit, wherein each of the connection gears are engaged with or disengaged from the relative movement unit as a result of being reciprocated on the end of the respective driving shaft by the operation unit so as to activate or deactivate a tool.

2. The orbital cutting apparatus of claim 1, wherein each connection gear is configured to repeatedly go in and out by a pusher of the operation unit such that each connection gear is engaged by a first push of the pusher and disengaged by a second push of the pusher, or vice versa.

3. The orbital cutting apparatus of claim 1, wherein the plurality of tool units receive the rotational power of the relative movement unit through the driving shafts so as to convert a rotational movement into a vertical reciprocating movement.

4. The orbital cutting apparatus of claim 1, wherein the main body is configured to reciprocate in the longitudinal direction (Z axis) of the material by the control unit.

5. The orbital cutting apparatus of claim 1, wherein the main body is configured to move up or down depending on a caliber of the material.

6. The orbital cutting apparatus of claim 1, wherein the control unit includes a Human Machine Interface (HMI) touch screen configured to input or output of movement and processing conditions of components.

7. The orbital cutting apparatus of claim 1, further comprising: a tool sensor configured to detect the positions of the plurality of cutting tools so as to present a reference point of a movement in an X-axis direction.

8. The orbital cutting apparatus of claim 1, further comprising:

a clamping unit installed on each side or any one side of the main body so as to fix the material, wherein the clamping unit rotates a clamping wheel using at least one driver, and moves to be retracted or expanded such that a plurality of jaws tighten the material by a rotation of the clamping wheel, and the clamping wheel or the driver is provided with a scale configured to feedback a movement to the control unit so as to precisely control the movement of the clamping unit.

9. The orbital cutting apparatus of claim 1, wherein driving units of the spindle rotating unit and the relative movement unit mutually monitor respective loads of one another so as to enhance precision in synchronization.

* * * * *